United States Patent [19]

Garuglieri

[11] Patent Number: 5,239,906
[45] Date of Patent: Aug. 31, 1993

[54] CIRCULAR SAW ARRANGEMENT

[75] Inventor: Andrea Garuglieri, Colle Brianza, Italy

[73] Assignee: Black & Decker, Inc., Newark, Del.

[21] Appl. No.: 840,787

[22] Filed: Feb. 24, 1992

[30] Foreign Application Priority Data

Feb. 28, 1991 [DE] Fed. Rep. of Germany ....... 4106636

[51] Int. Cl.⁵ .......................... B26D 1/16; B26D 1/18
[52] U.S. Cl. .................... 83/471.3; 83/477.1; 83/477.2; 83/486.1; 83/490
[58] Field of Search .................. 83/471.3, 471.2, 477.1, 83/486.1, 490, 491

[56] References Cited

U.S. PATENT DOCUMENTS

| 2,556,137 | 5/1951 | Emmons | 83/486.1 |
| 2,559,283 | 7/1951 | Dick | 83/473 |
| 2,718,907 | 4/1953 | Fjalstad | 83/581 |
| 2,737,213 | 3/1956 | Richards et al. | 83/491 X |
| 3,483,901 | 12/1969 | Ray | 83/471.3 |
| 3,540,338 | 11/1979 | McEwan et al. | 83/490 |
| 4,163,404 | 8/1979 | Lavis | 83/486.1 X |
| 4,181,057 | 1/1980 | Bassett | 83/486.1 |
| 4,452,117 | 6/1984 | Brickner et al. | 83/468 |
| 4,587,875 | 5/1986 | Deley | 83/490 X |
| 4,817,581 | 4/1989 | Trentadue | 83/486 X |
| 4,864,142 | 9/1989 | Sato et al. | 83/490 X |
| 5,054,352 | 10/1991 | Fushiya et al. | 83/490 X |

FOREIGN PATENT DOCUMENTS 0242733 10/1987 European Pat. Off. .
3737814 9/1988 Fed. Rep. of Germany .
3923470 1/1991 Fed. Rep. of Germany .

Primary Examiner—Frank T. Yost
Assistant Examiner—Clark F. Dexter
Attorney, Agent, or Firm—Dennis A. Dearing; Charles E. Yocum; Edward D. C. Bartlett

[57] ABSTRACT

A circular saw arrangement has a table arrangement which provides a support area for the workpiece to be cut. For cutting the workpiece, a saw unit is provided for chop-saw and rip-saw cutting. The saw unit contains a power saw blade which is pivotally lowered from a raised position in the direction of the support area for chop-saw cutting. The axis of the saw blade is spaced from and parallel to the axis of the armature of the motor, and the pivotable movement of the saw blade is centered about the armature axis of the motor so that the motor remains stationary during the chop-saw movement. Elongate guide rods are supported in a cantilevered manner by a vertical support member connected to the table arrangement wherein the distance between the guide rods and the table arrangement remains constant in all positions of the saw blade, and the saw unit is slidably carried on the elongate guide rods for rip-saw cutting. Further, the vertical support is pivotally supported by the table arrangement to provide for mitre cutting.

8 Claims, 29 Drawing Sheets

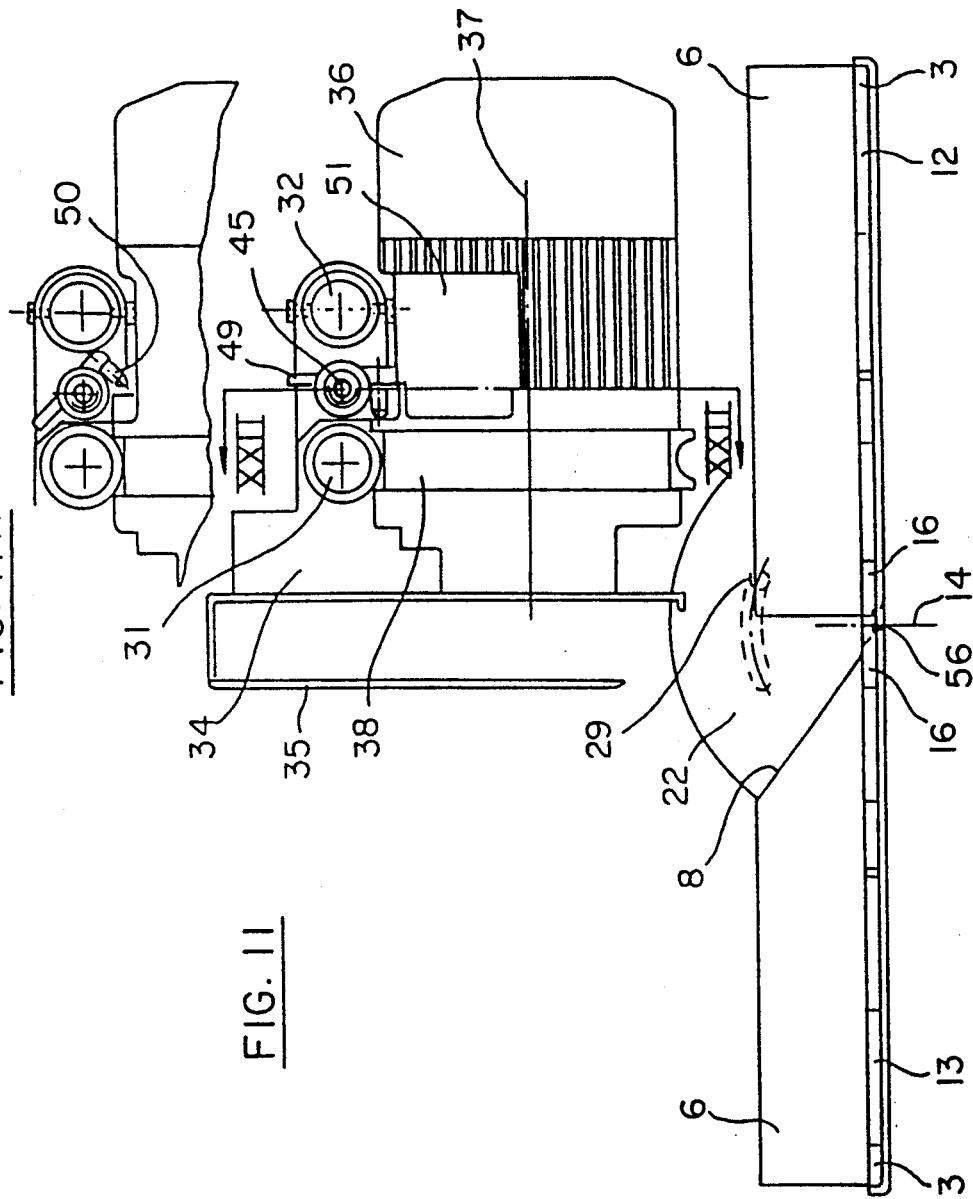

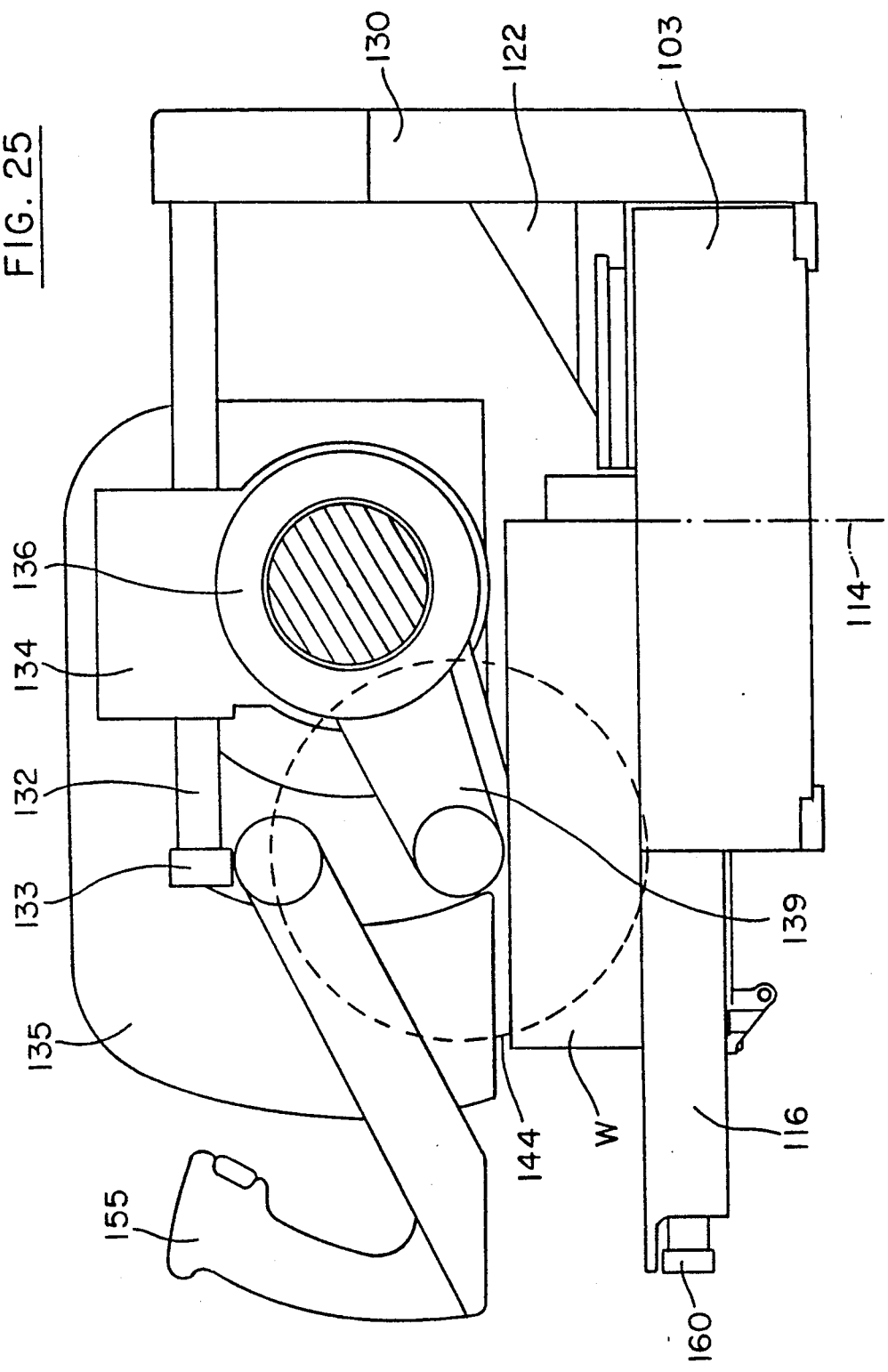

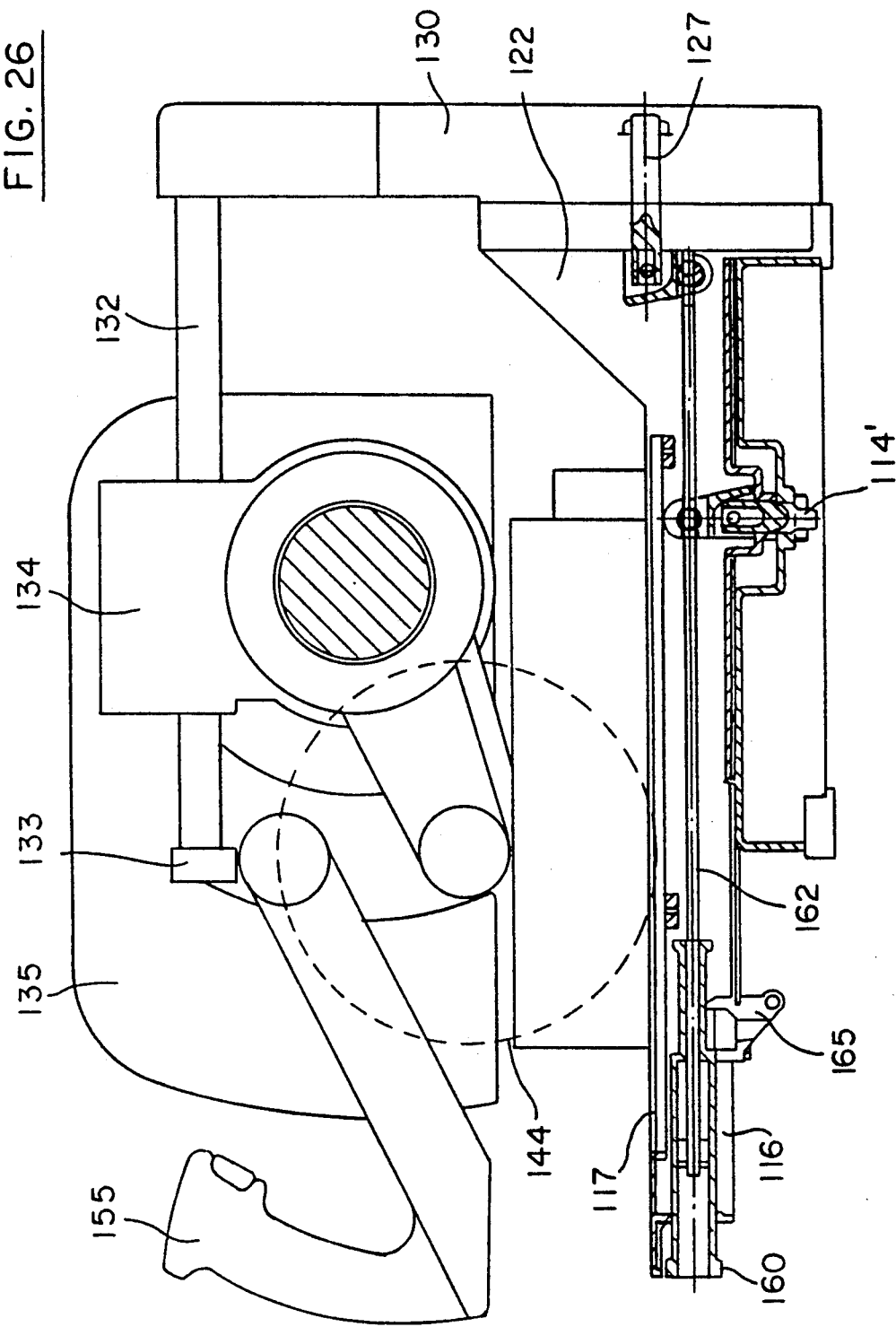

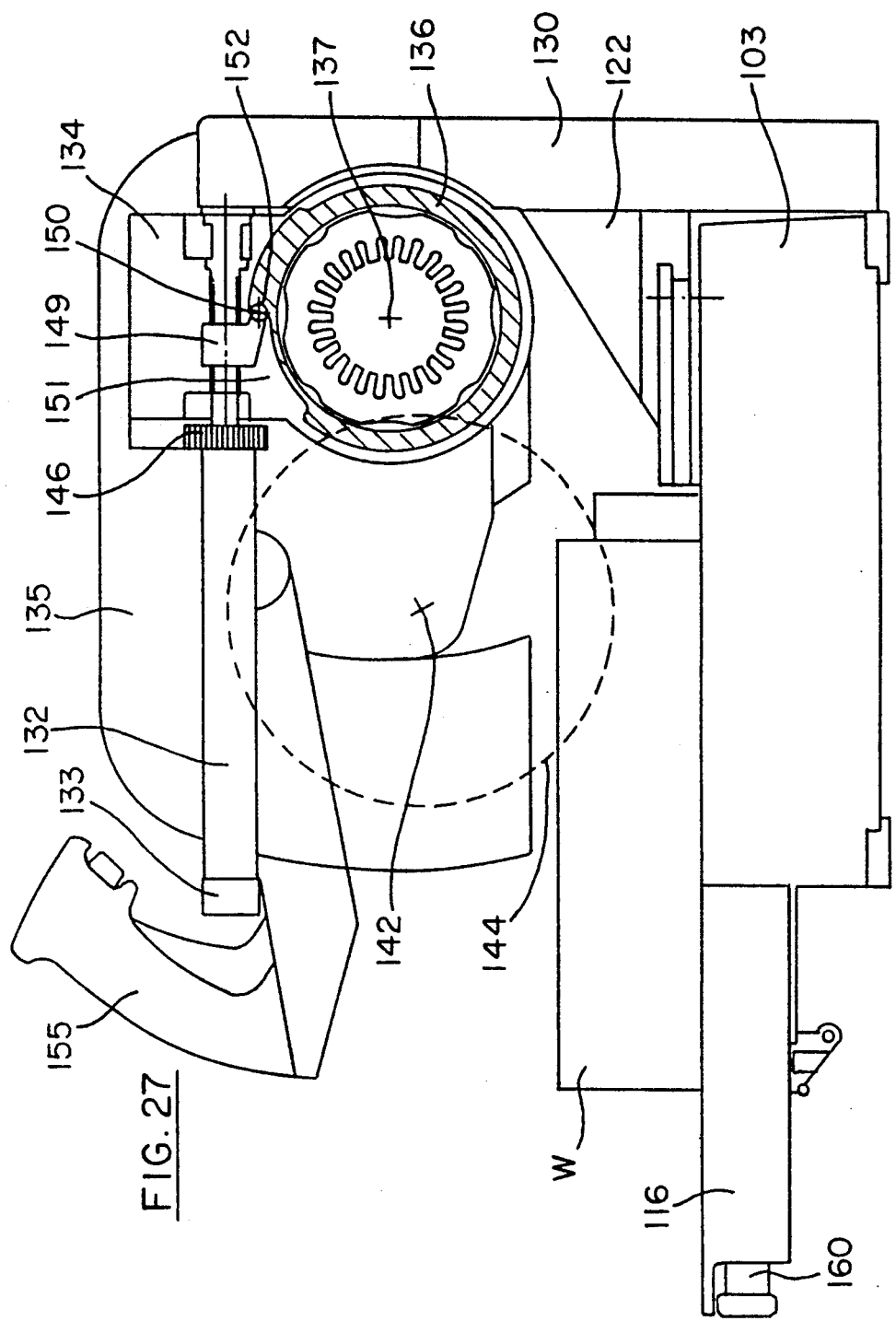

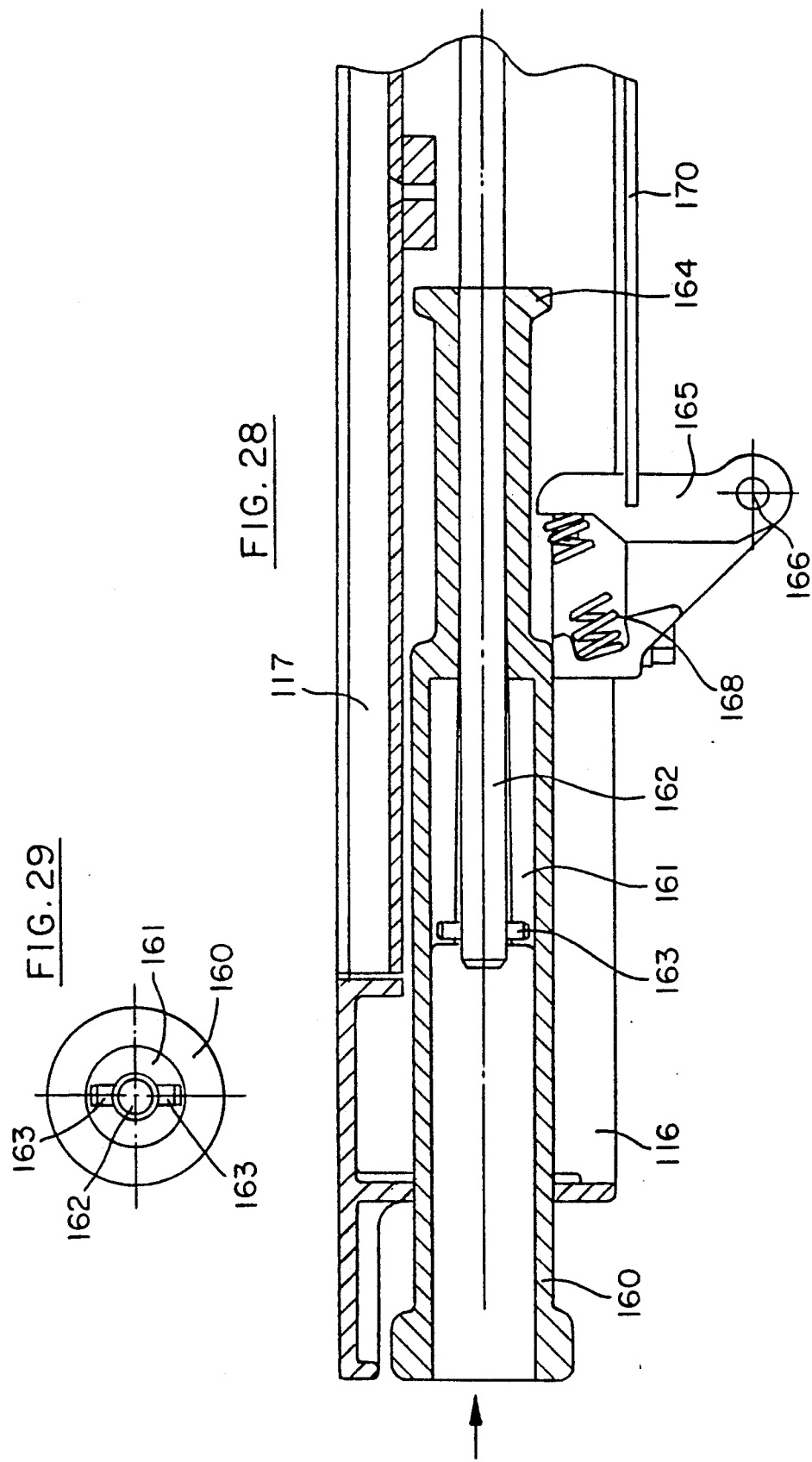

CIRCULAR SAW ARRANGEMENT

BACKGROUND OF THE INVENTION

The invention relates to a circular saw arrangement or assembly with a support for the workpiece to be cut and with a saw unit containing the powered saw blade which saw unit is carried by an elongate guide means located above said support the guiding portion of said guide means being at a constant distance from the support wherein the saw blade can be reciprocated in the longitudinal direction of the guide means and can be lowered from an elevated position.

With a known circular saw arrangement of this type (See published German Patent Application 37 37 814 and German Patent Application 39 23 470) the saw unit containing the saw blade is pivotable, but mounted non-movable in the longitudinal direction of the guide means at the front end of the elongate guide means which for example can comprise two parallel guide rods. The guide means is mounted movable in its longitudinal direction in a bearing arrangement which is securely connected with the table arrangement. The saw blade present in the saw unit can therefor be lowered from an elevated position about a pivot axis present in the area of the connection with the guide means, so that a chop-cut saw function results. In addition, the guide means with the saw unit mounted at its front end can be displaced in the longitudinal direction of the guide means relative to the bearing, so that a rip-saw function results. One advantage of this known arrangement is that moving the elongate guide means relative to the bearing arrangement always maintains the pivot axis for the saw unit at the same perpendicular distance from the support for the workpiece, so that the saw blade can be moved in a defined lowered position together with the guide means in its longitudinal direction thereof and thus a notch or groove of pre-given depth, constant over its total extent, can be produced in a workpiece.

Whereas the known circular saw arrangement, with a compact structure, unites a chop-cut saw and a rip-saw function, it has the considerable disadvantage that, in the starting position of the saw unit, i.e. when the saw unit is located at the smallest distance from the bearing arrangement for the elongate guide means, the elongate guide means extends far beyond said bearing arrangement on the rearward side of the bearing arrangement facing away from the saw unit. When using the known circular saw arrangement care must therefore be taken that sufficient free space remains behind the floor space for the guide means to move in its longitudinal direction. The greater the desired cut width of the circular saw arrangement is, the greater the size of this free space must be. Obviously, this considerably weakens an essential advantage of the combination of chop-cut saw function and rip-saw function in a circular saw arrangement, because this design requires considerable space when in operation.

A circular saw arrangement is also already known (See published European Patent No. 0 242 733) which combines the chop-cut saw function and rip-saw function and in which an elongate guide means in the shape of a guide rods is pivotable against spring force, but in its longitudinal direction is mounted non-movable to the table arrangement. The saw unit containing the saw blade is movable on this guide means in the longitudinal direction from a position near to the connection of the guide means and the table arrangement in the direction of the free end of the guide means, and the saw blade can be lowered from its elevated position by pivoting the guide means against spring force.

This known design has the advantage that during operation the guide means is not moved out over the side of the connection of the guide means and the table arrangement facing away from the saw unit, so that it is not necessary to have free space at the rear of the circular saw arrangement as is the case with the previously mentioned circular saw arrangement with its guide means movable in longitudinal direction. However, the difficulty with the known circular saw arrangement with guide means non-movable in its longitudinal direction is that it is not possible when carrying out a rip-saw cut to guide the saw blade at an exact, perpendicular distance from the support and thus produce a notch or groove of constant depth in a workpiece, because the saw unit is lowered by pivoting the guide means in the area of one of the ends thereof. To achieve a notch or groove of constant depth in a workpiece while the user moves the saw unit along the guide means, the guide means would therefore have to be continuously and accurately pivoted, which is not feasible.

Moreover, the known circular saw arrangement with guide means pivotable, yet non-movable in longitudinal direction has the disadvantage that the force to be applied to pivot the saw unit when moving the saw unit towards the free end of the guide means continuously increases. Because the guide means in its starting position is urged upwardly towards its free end by the action of the spring, the force to be applied by the user to overcome the spring force pressing the guide means with its pivoted-up position becomes greater the further the saw unit is moved towards the free end of the guide means, and thus, the saw unit must be held in an essentially defined lowered position relative to the support.

So-called radial arm saws are also known (U.S. Pat. No. 2 559 283) in which a saw unit carrying a powered circular saw blade can be moved over the support of a table arrangement along an elongate guide means which is non-movable in its longitudinal direction; the guide means running parallel to the support and the saw blade being thus guided through the workpiece with a constant penetration depth. However, in order to change the penetration depth of the saw blade with these radial arm saws, the user must operate the guide in the perpendicular direction, and set it to the desired penetration depth before the actual sawing operation to change the distance of the guide means from the support. This requires a very solid structure in order to, on the one hand, keep the guide means stable and, on the other hand, to permit its adjustment in the perpendicular, so that such a structure is practically suitable only for relatively large machines to be used professionally. Moreover, with such a machine, a chop-cut saw function is not possible, which, however, is desired in many applications to carry out separation tasks quickly.

It is the aim of the invention to provide for a circular saw arrangement with combined chop-cut saw function and rip-saw function, which, with a compact structure and occupying little space during use, permits notches or grooves of constant depth to be produced in a workpiece and in which the force to be applied to lower the saw blade is independent of the position of the saw unit.

To achieve this aim a circular saw arrangement of the initially mentioned type is designed so that the elongate guide means is mounted non-movable in its longitudinal direction with respect to the support and the saw unit is movable along the guide means.

BRIEF DESCRIPTION OF THE INVENTION

According to the present invention, a circular saw arrangement of assembly is provided with a support (3, 15; 103, 115) for the workpiece (W) to be cut and with a saw unit containing the saw blade (44; 144) and the electric motor (36; 136) driving such saw blade which saw unit is carried by an elongate guide means (31, 32; 131, 132) located above said support (3, 15; 103, 115) the guiding portion of said guide means (31, 32; 131, 132) being at a constant distance from the support (3, 15; 103, 115) wherein the saw blade (44; 144) can be reciprocated in the longitudinal direction of the guide means (31, 32; 131, 132) and can be lowered from an elevated position and wherein the axis of rotation (42; 142) of the saw blade (44; 144) extends in parallel to the armature shaft of the electric motor (36; 136), characterized in that the elongate guide means (31, 32; 131, 132) are mounted non-movably in their longitudinal direction with respect to said support (3, 15; 103, 115) and the saw unit is movable along said guide means (31, 32; 131, 132) by means of a slide element (34; 134), that a carrier element (39, 139) is pivotably mounted on said slide element (34; 134) which carrier element (39; 139) carries the saw blade (44; 144) and that the pivot axis (37; 137) of the carrier element (39; 139) and the longitudinal axis of the armature shaft of the electric motor (36; 136) extend coaxially.

Thus, with the circular saw arrangement according to the invention, the elongate guide means is not moved in its longitudinal direction during operation, and therefore does not change its position in this direction, so that the space required for the circular saw arrangement according to the invention also remains invariably small in each operating state, whilst the saw unit can be moved along the longitudinally non-movable guide means to carry out rip-saws. Moreover, the saw blade can be lowered from an elevated position relative to the guide means to carry out chop-cuts. Thus, the circular saw arrangement according to the invention not only has the advantages of the known circular saw arrangement with movable elongate guide means, at whose front end the saw unit is mounted non-movable in longitudinal direction, but also avoids the need, during operation, for a relatively large free space at the rear of the circular saw arrangement for a guide means projecting rearwards in the starting position of the saw unit.

With the circular saw arrangement according to the invention, a fence arrangement forming a positioning face for positioning the workpiece is usually provided in the area of the support, and then the guide means can be connected to the support at the side of the fence arrangement facing away from the workpiece positioning face.

The support can comprise a support element mounted on a table plate and rotatable about a vertical axis wherein the mounting arrangement for the guide means is mounted on the support element. In this way, by rotating the support element, the saw blade can be brought into a position for carrying out mitre cuts. For this the rotation axis of the support element preferably lies in the plane of the workpiece positioning face of the fence arrangement and in the area of a recess in the fence arrangement through which the saw blade can pass.

The saw unit is usually movable against spring force from a position near to the connection of the guide means and the support in the longitudinal direction of the guide means to its free end.

For a slidable connection of the saw unit and the guide means, a slide element can be present which is in slidable engagement with the guide means and relative to which the saw blade can be lowered from its elevated position. For this a carrier element can be mounted pivotable on the slide element which carrier element carries the saw blade.

With such a type of circular saw arrangement an electric motor is usually present for driving the saw blade, which electric motor can be mounted on the carrier element, wherein the pivot axis for moving the carrier element with respect to the slide element can run parallel to the armature shaft of the electric motor and parallel to the axis of rotation of the saw blade.

With such a type of arrangement it is quite especially advantageous if the longitudinal axis of the armature shaft of the electric motor and the pivot axis for moving the carrier element with respect to the slide element extend coaxially, because then, upon lowering the saw blade from its elevated position, the electric motor is rotated about it longitudinal axis but its height position is not o changed. Therefore, there is no lifting movement of the electric motor, for which the user would have to apply additional force, and there is also no lowering movement of the electric motor, which could bring the latter into the area of the workpiece and thus create a limitation for the height of the workpieces to be processed.

For effecting a drive coupling of electric motor and saw blade, an endless belt, preferably a toothed belt, can be used.

The saw blade can be lowered from its elevated position into an end position which is defined for example by a stop. This stop is preferably adjustable so that the end position of the saw blade can also be changed. In this way lowered positions of the saw blade can be defined, which permits, for example, notches or grooves of pre-determined depth to be produced in the workpiece, a workpiece to be separated by a combined chop-cut and rip-cut and also a workpiece to be separated by a chop-cut, i.e. a movement of the saw blade into a deeper end position than with the combined cross and rip-cut.

BRIEF DESCRIPTION OF THE DRAWINGS

The invention is further illustrated in the following description with reference to the Figures showing two embodiments.

FIG. 11 shows in a partial representation the position of guide means, the slide element mounted to it with, electric motor and protective cover, and the table plate, and the pivoted stop of the limiting stop arrangement being in its engaged position.

FIG. 11-A is a fragmentary view of the motor and the pivoted stop showing the pivoted stop in its released position.

FIG. 25 shows a side view of the circular saw arrangement from FIG. 23 and 24 with the saw blade lowered into the cutting position and moved along the guide means.

FIG. 26 shows, in a representation corresponding to FIG. 25, and additionally in section, the equipment for the positioning of the saw blade.

FIG. 27 shows the saw blade in a representation essentially corresponding to FIGS. 25 and 26, in a position for producing in a workpiece a notch of pre-determined depth, the limiting stop arrangement also being recognizable.

FIG. 28 shows, in a partial section, the outer area of the setting device for the saw blade.

FIG. 29 shows a view of part of the setting device in the direction of the arrow from FIG. 28.

Figure 1:
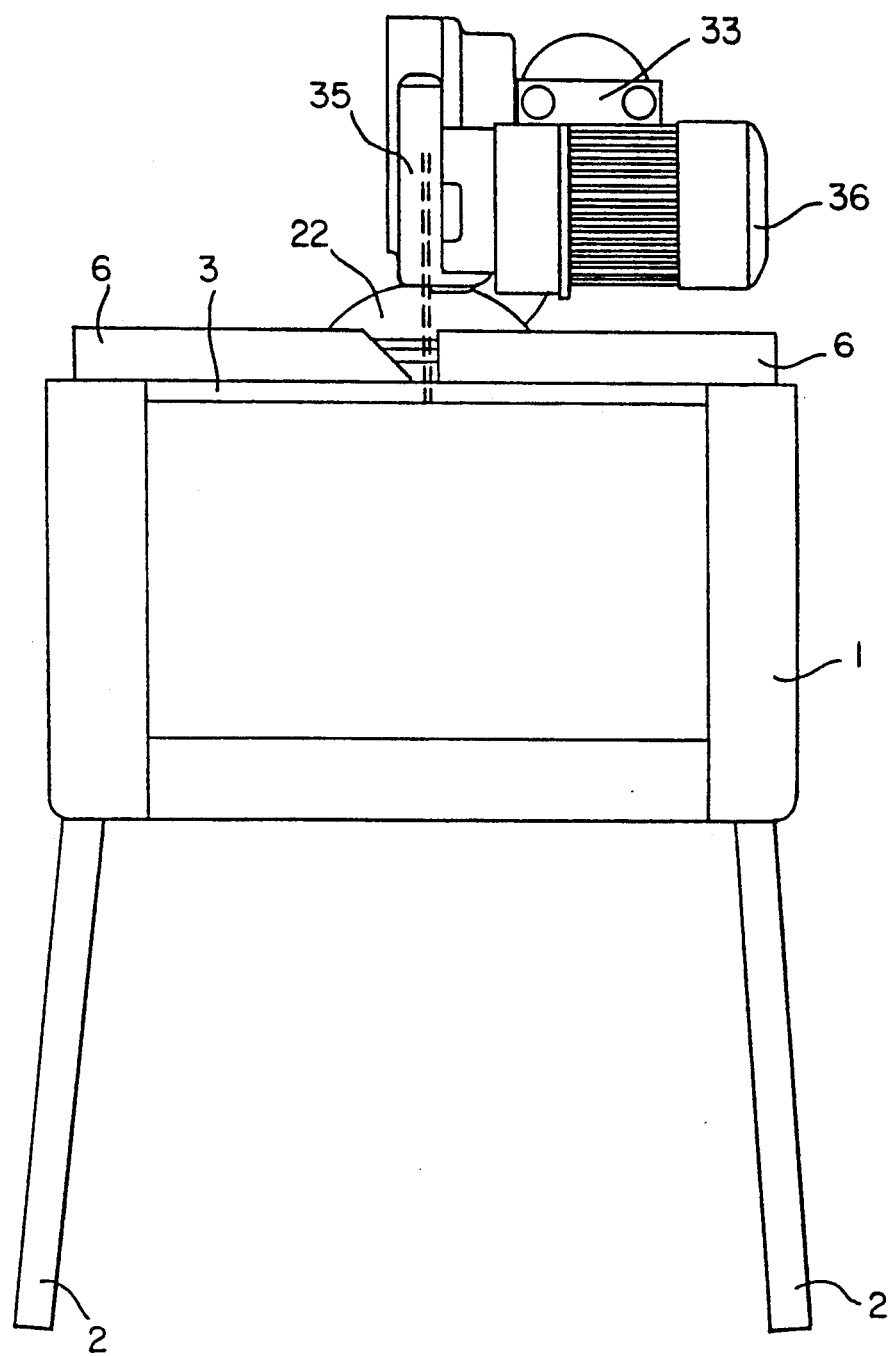
FIG. 1 shows a front view of an embodiment of a circular saw arrangement with the table plate located in the first position.

It should be mentioned that, for ease of understanding, the figures for both embodiments do not contain all section patterns and hatching lines which normally are to be provided, and that views have been shown partly in diagrammatic form.

DETAILED DESCRIPTION OF DRAWINGS AND PREFERRED EMBODIMENTS

The circular saw arrangement or assembly represented in FIGS. 1 to 22 has a frame 1 which has four legs 2, and into the top end of which a table plate 3 is pivotally mounted and rotatable about a horizontal axis 5. The table plate 3 is secured in its position relative to the frame 1 in the position as per FIGS. 1 to 5, in which its first side faces upwardly, by means of fixing devices, e.g. the socket pins 4 diagrammatically indicated in FIGS. 2 and 20, which extend through the frame 1 and into the table plate 3.

Figure 2:
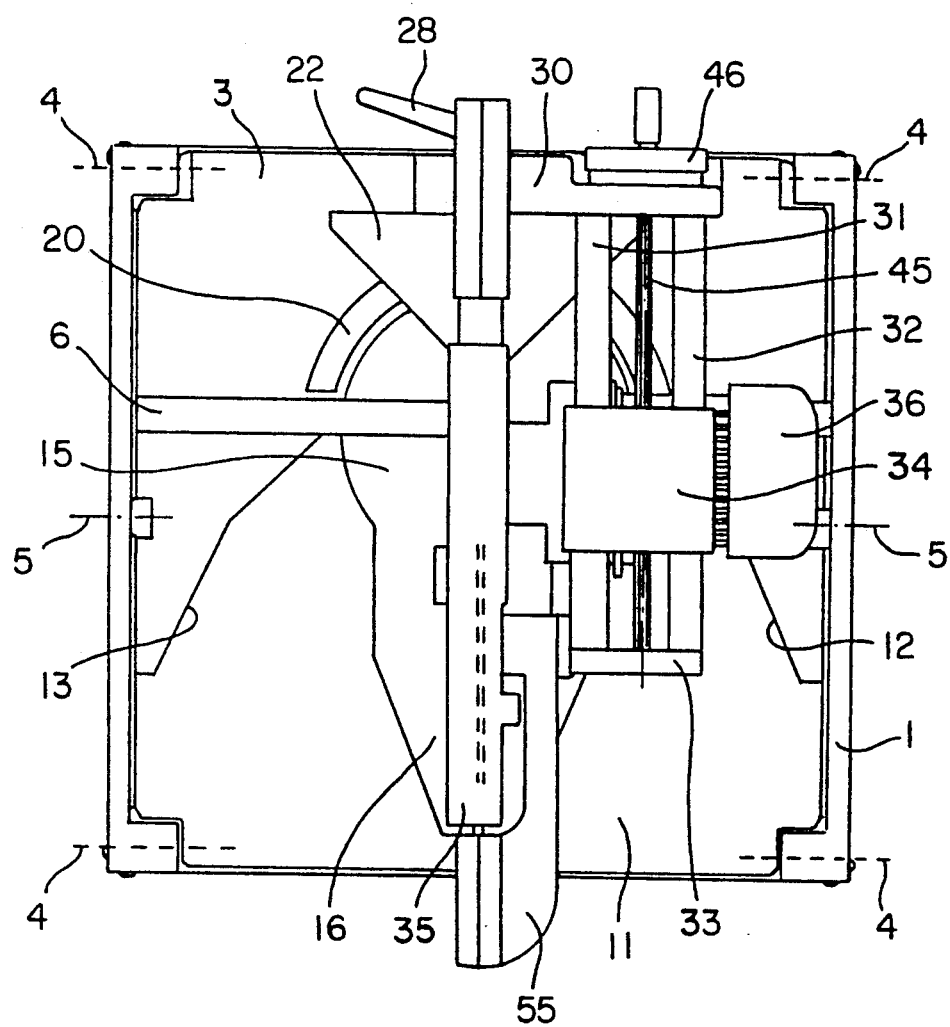
FIG. 2 shows a top plan view of the circular saw arrangement according to FIG. 1.

As FIG. 2 in particular shows, the table plate 3 is essentially rectangular in shape and has recesses at its corners, into which areas of the, frame 1 extend, through which pins 4 are guided. As shown in FIGS. 1 to 17 on the first or upper side of the table plate 3 a fence 6 is mounted to support a workpiece W to be worked, which fence extends at a distance from the rotation axis 5 of the table plate 3 and parallel to the latter. In the centre area, the fence 6 has a recess 7 which is limited at one side by an inclined edge 8 (FIG. 1).

On the first side of table plate 3, a support element 15 is mounted rotatable about a rotation axis 14 (FIGS. 6 and 11) lying perpendicular to the main plane of the table plate; said support element being in the form of a plate and overlaying areas of the first side of the table plate 3. The rotation axis 14 lies in the center of the recess 7 of the fence 6 and in the plane of the stop face for the workpiece W formed by the fence 6. A roughly circular part of the support element 15 is arranged about this rotation axis 14; an elongate section 16 projecting from said circular part. In the elongate section 16, a through-passage slot 17 extends in the longitudinal direction to the rotation axis 14 and is open at its opposite outer end.

To receive the plate-like support carrier element 15, a recess 11 is formed on the first side of the table plate 3, so that the outer edge of the area of the support element 15 facing away from the elongate section 16 of the support element 15 is relatively closely surrounded by the delimitation wall of the recess 11, whilst, at the side of the fence 6 facing the elongate section 16, the recess extends towards the side edges of the table plate 3 which run perpendicular to the rotation axis 5. The thus-formed lateral delimitation walls 12 and 13 of the recess 11 terminate at a distance from the edge of the table plate 3 running parallel to the fence 6.

Figure 6:
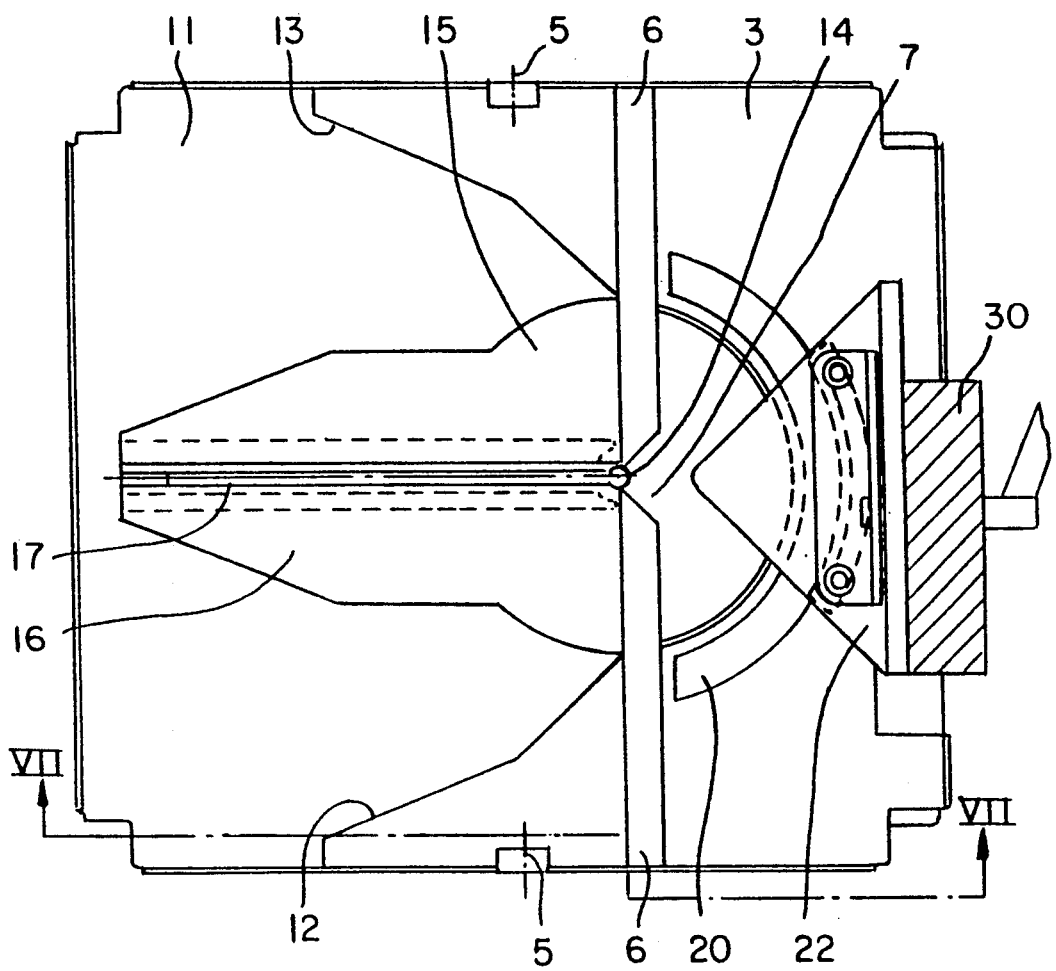
FIG. 6 shows a top plan view of the circular saw arrangement as per FIGS. 1 to 5; the saw unit and the guide means for this as well as the frame being omitted, and the carrier element being located in the center position.
Figure 7:
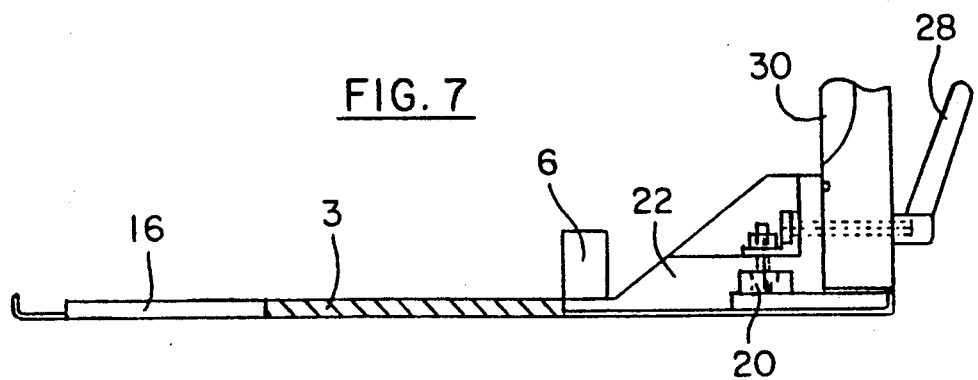
FIG. 7 shows partly a view and partly a section along the line VII—VII of FIG. 6.
Figure 8:
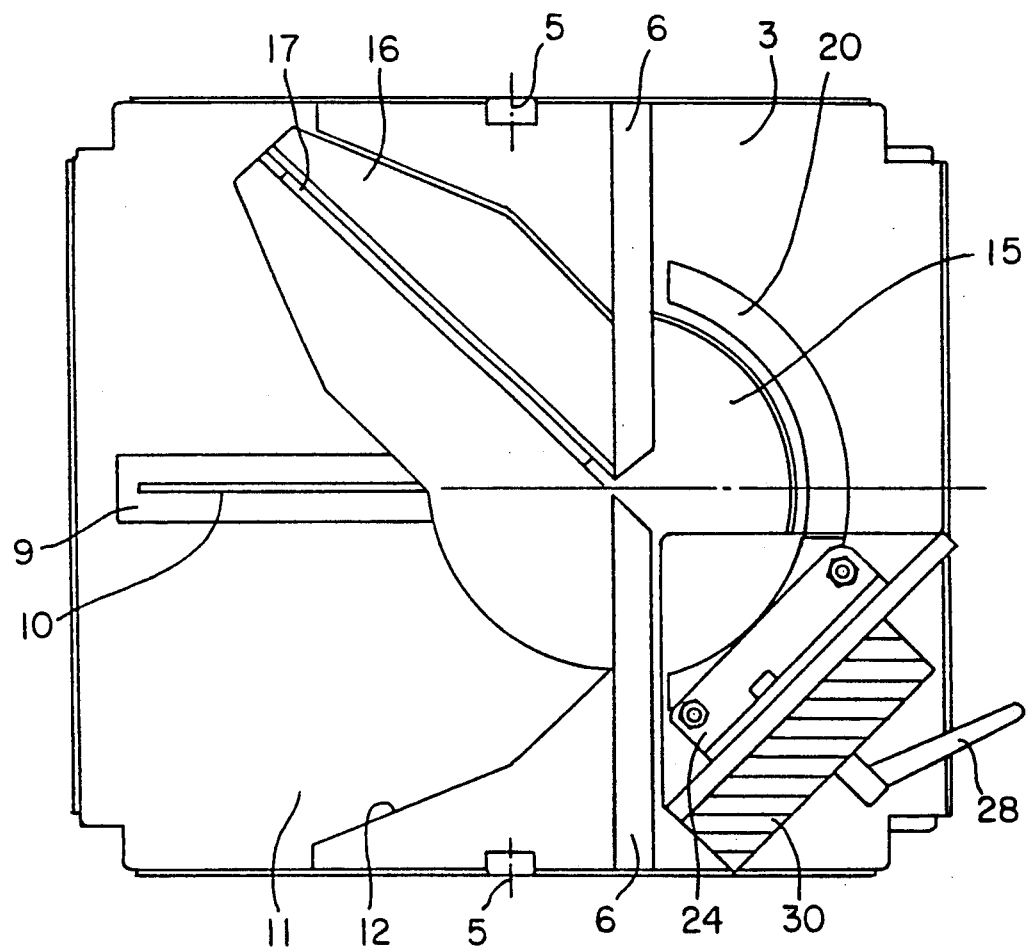
FIG. 8 shows the circular saw arrangement in a representation corresponding to FIG. 6 with the carrier element rotated out of its center position.

As is to be particularly seen from FIG. 8, the side walls 12 and 13 of the recess 11 of the table plate 3 are formed corresponding to the side walls of the elongate section 16 of the support element 15 and form stops, by means of which the rotation of the support element 15 about the rotation axis 14 out of the center position as per FIG. 6 is limited. The upper surfaces of the non-recessed parts of the table plate 3 on the left side of the fence 6 in FIGS. 6 and 8 lie in the same plane as the upper surface of the support element 15 so that the table plate 3 and the support element 15 form supporting sections for a workpiece W, which is laid against the workpiece positioning face of the fence 6 for treatment.

As is to be particularly seen from FIG. 8, a slot-like opening 10 is located in the area of the recess 11 of the table plate 3, designed as an insert unit 9 fitted into the table plate 3 and having a longitudinal axis extending through the rotation axis 14 and perpendicular to the workpiece positioning face of the fence 6. Thus, in the center position of the support element 15 according to figure 6, the slot-like opening 10 is covered by the through-passage slot 17 in the support element 15 or the through-passage slot 17 and the slot-like opening 10 are arranged flush in the center position.

As previously mentioned, the support element 15 is plate-like and has a planar lower and a planar upper face, the planar lower face resting on the planar upper face of the table plate 3 in the area of the recess 11. The thickness of the support element 15 is chosen to be as small as possible whilst being just strong enough. The thickness of the table plate 3 in the area of the slot-like opening 10 should likewise be as small as possible and the thickness preferably equals the thickness of the support element 15 in the section containing the through-passage slot 17. The reason for this will be explained later.

Figure 9:
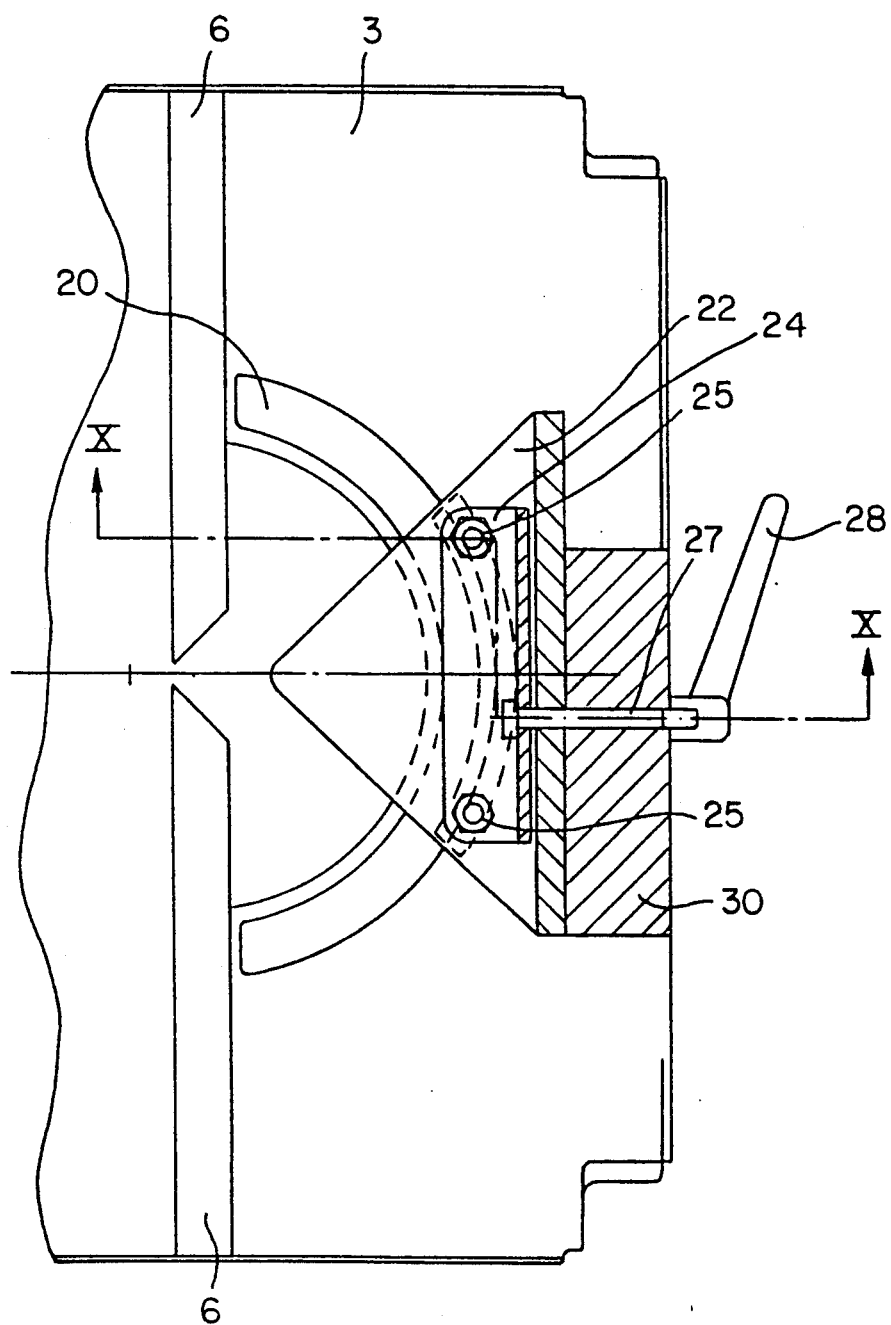
FIG. 9 shows a partial section along the line IX—IX of FIG. 10.

Secured on the support element 15, such as by welding, in the area opposite the elongate section 16, at a clearly lesser distance from the rotation axis 14 than the outer end of the through-passage slot 17, is a connection part 22 which on its lower side has a curved duct 23 indicated in FIG. 9 with dashes, into which a curved guide rib section 20 forming part of the table plate 3 extends. Inserted through two bores provided in the connection part 22 and extending from above into the duct 23, are screw bolts 25 which have a lower, angled section 26 extending behind a projecting area 21 of the guide-rib section 20. The upper ends of the screw bolts 25 extend through one leg of an angular clamp 24 and are connected to this by means of nuts. The other leg of the angular clamp 24 lies adjacent to a perpendicular wall of the connection part 22, and extending through the latter and said wall is a clamping bolt 27 which lies with its head against the surface of the leg of the angular clamp 24 facing away from the perpendicular wall of the connection part 22. The clamping bolt 27 extends on the side of the perpendicular wall of the connection part 22 facing away from the angular clamp 24, through a vertically extending support 30. Bolt 27 has a threaded section extending beyond vertical support 30 and engaging by screwing with a clamping lever 28. On the side of the vertical support 30 facing the perpendicular wall of the connection part 22, a circular arc-shaped guide groove is formed, indicated in FIG. 11 by dashes and with the center of its circle lying on the rotation axis 56, likewise indicated in FIG. 11. A guide projection 29, formed at the perpendicular wall of the connection part 22, projects into this guide groove; during sawing with the saw blade aligned perpendicular to the main plane of the table 3, said guide projection lies at the right-hand end, in FIG. 11, of the guide groove.

Figure 10:
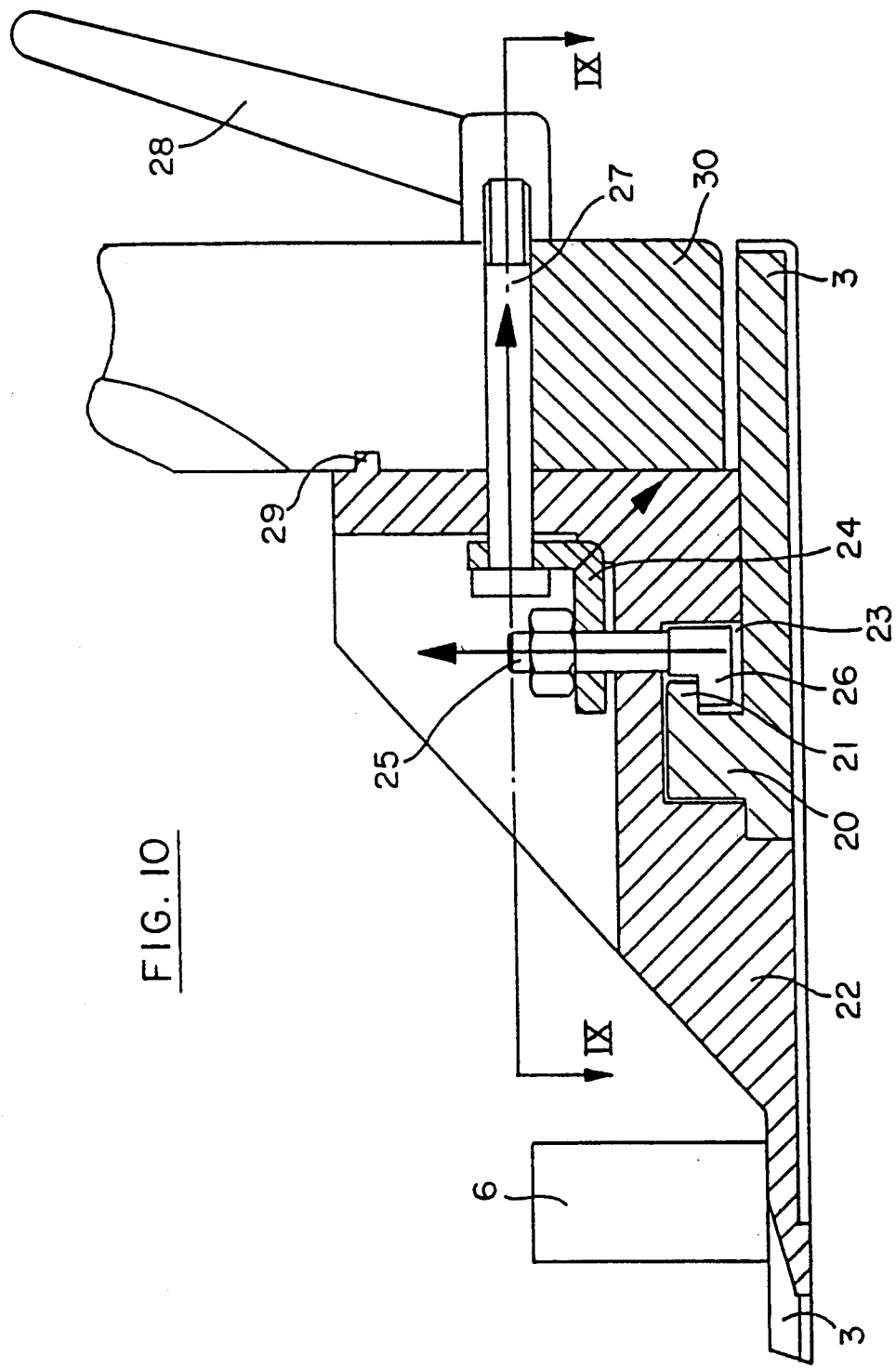
FIG. 10 shows a partial section along the line X—X of FIG. 9.

When the clamping lever 28 is released, the areal engagement between the vertical support 30 and the perpendicular wall of the connection part 22, and the engagement between the angled section 26 of the screw bolt 25 and the projecting area 21 of the guide-rib section 20, loosens. In this released position, the vertical support 30 and the connection part 22, and thus the support element 15 securely connected to the connection part 22, can therefore be moved about the rotation axis 14 into the desired position, say from the center position according to FIG. 6 into the position according to FIG. 8 or any intermediate position. If, in the position reached, the clamping lever 28 is once more rotated so that the clamping bolt 27 once more applies a load to the angular clamp 24 supporting itself with the cutting area of the legs in a rise in the connection part 22, the leg of the angular clamp 24 engaging with the clamping bolt 27, perpendicular in FIG. 10, is moved in the direction of the perpendicular wall of the connection part 22 and so tilted to the extent of the rise at the connection part 22. Thus, the other leg of the angular clamp 24 raises the screw bolt 25 in the direction of the arrow by abutment against its nut and clamps the angled section 26 of the screw bolt 25 by abutment against the projecting area 21 of the guide-rib section 20 forming part of the table plate 3. In this way, the position of the vertical support 30 and support element 15 relative to the first side of the table plate 3 may be set in various positions for making mitre cuts.

In the previously mentioned, released state of the clamping lever 28 it is also possible to change the angle of the vertical support 30 from the vertical position by moving it about the horizontal axis 56 (FIG. 11); the guide projection 29 then being moved in the curved guide groove of the vertical support. Vertical support 30 may then be secured in such angled position by rotating clamping lever 28 as previously described.

At the upper end region of the vertical support 30, a guide means is connected in the shape of two guide rods 31, 32, running at a distance from, and parallel to, each other, having a circular cross-section and connected at their free end by a transverse element 33. The guide rods 31 and 32 run parallel to the main plane of the table plate 3 and thus also parallel to the support surfaces, formed by the first side of the table plate 3 in cooperation with the support element 15, for a workpiece W to be treated. The two guide rods 31 and 32 extend, parallel to the longitudinal direction of the through-passage slot 17, in the support element 15 and project in a cantilevered manner over the fence 6 in the direction of the free end of the elongate section 16 of the support element 15.

As shown in FIGS. 2 and 11, for example, between the two guide rods 31 and 32, and running parallel to them, a spindle 45 is arranged which has a hexagonal cross-section. The spindle 45 is mounted with its outer end rotatable in the transverse element 33 and extends with its inner end through the holding part 30; a hand wheel 46 being mounted on its inner end section projecting from the holding part 30.

Figure 13:
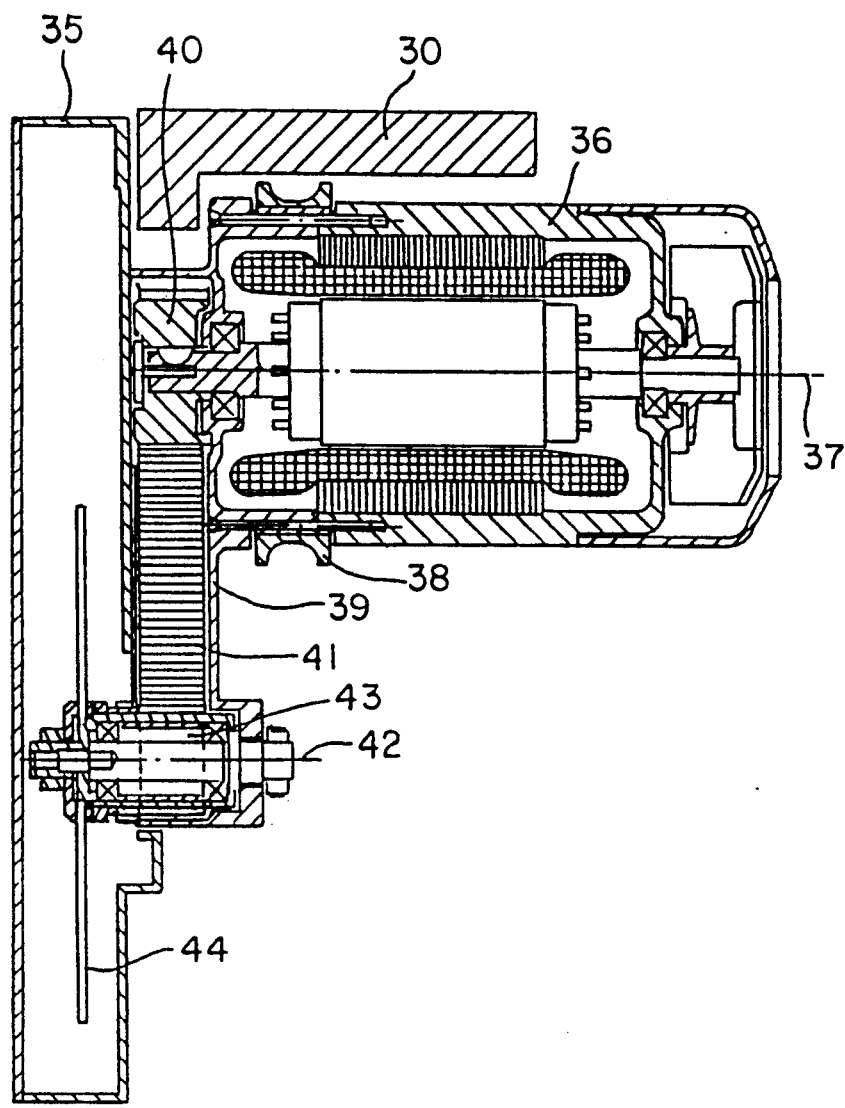
FIG. 13 shows a partial section essentially through the rotation axis of the saw blade and the center axis of the electric motor of the saw unit in the position as per FIG. 4.
Figure 12:
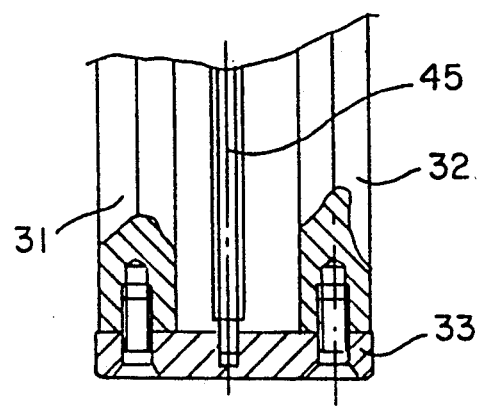
FIG. 12 shows, partly in section and partly as view, the free end area of the guide means.

As shown in FIGS. 2, 11 and 13, for example, on the guide means comprising guide rods 31 and 32 a slide 34 is arranged, movable in the longitudinal direction of the guide means, on which a holding or support ring 38 (FIG. 13) is mounted. This support ring coaxially encompasses an electric motor 36 so that the electric motor 36 is rotatable in the holding ring 38 about the longitudinal axis 37 of its armature shaft and thus relative to the slide 34. On one end of the armature shaft of the electric motor 36 is fixed, non-rotatably, a toothed wheel, over which an endless toothed belt 41 is guided. The housing section of the electric motor 36, which accommodates the toothed wheel 40, is extended perpendicular to the axis 37 of the armature shaft of the electric motor 36 and accommodates at its outer end a shaft, rotatable about a rotation axis 42, to which shaft the circular saw blade 44 is non-rotatably secured and which shaft supports, non-rotatably, a toothed wheel 43 which engages with the endless toothed belt 41. Upon rotation of the armature of the electric motor 36, the toothed belt 41 is thus driven by its toothed wheel 40, and thus, via the engagement of the toothed belt 41 with the toothed wheel 43, the saw blade 44 is rotated about the axis 42.

On the slide 34 is additionally mounted a protective hood 35 which encloses and protects the upper part of the saw blade 44. Moreover, on the housing part 39 of the electric motor 36 a hand grip 55 is mounted in the way recognizable in FIGS. 14 to 17.

Figure 3:
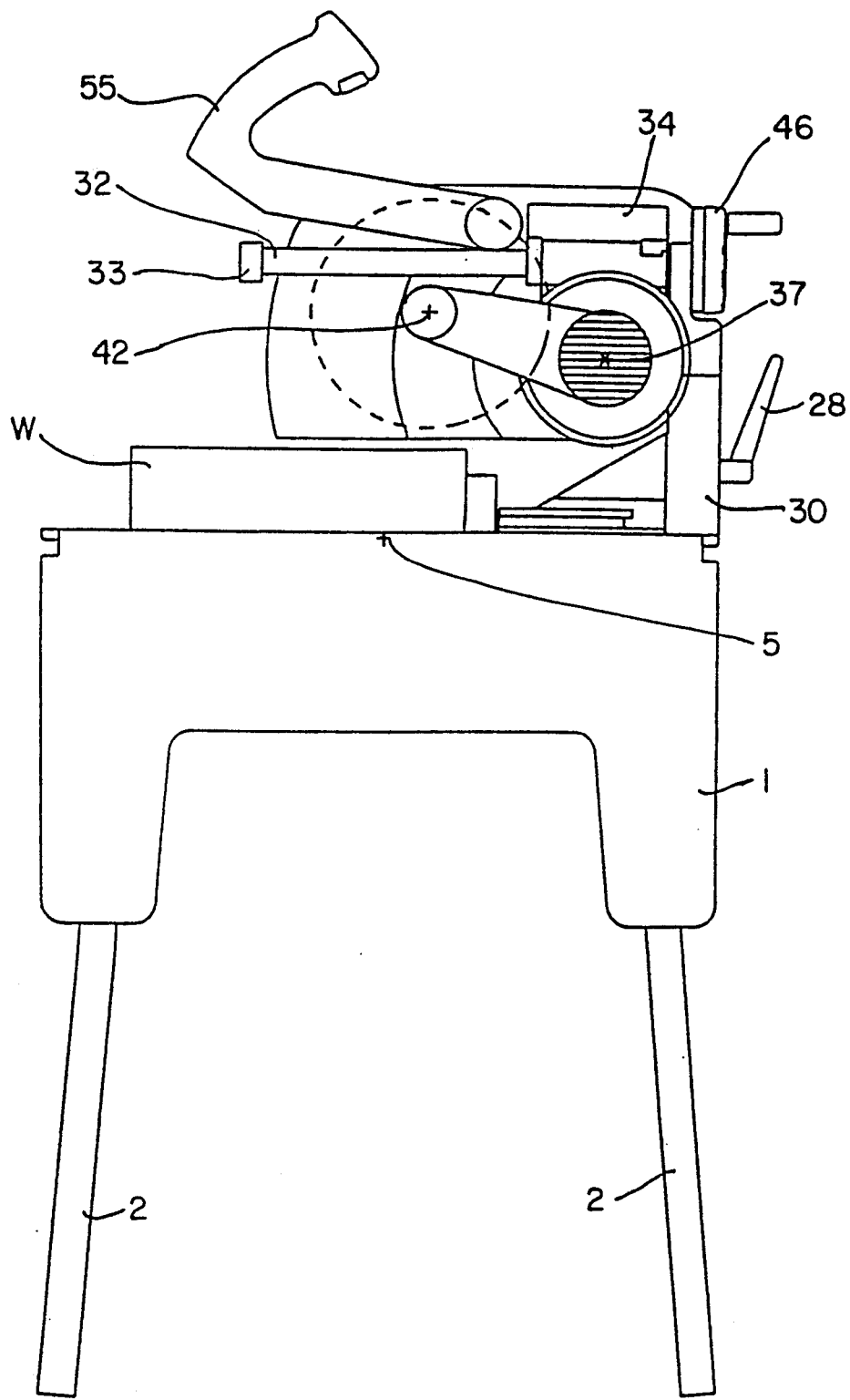
FIG. 3 shows a side view of the circular saw arrangement according to FIGS. 1 and 2; the saw blade being located in the elevated position.
Figure 4:
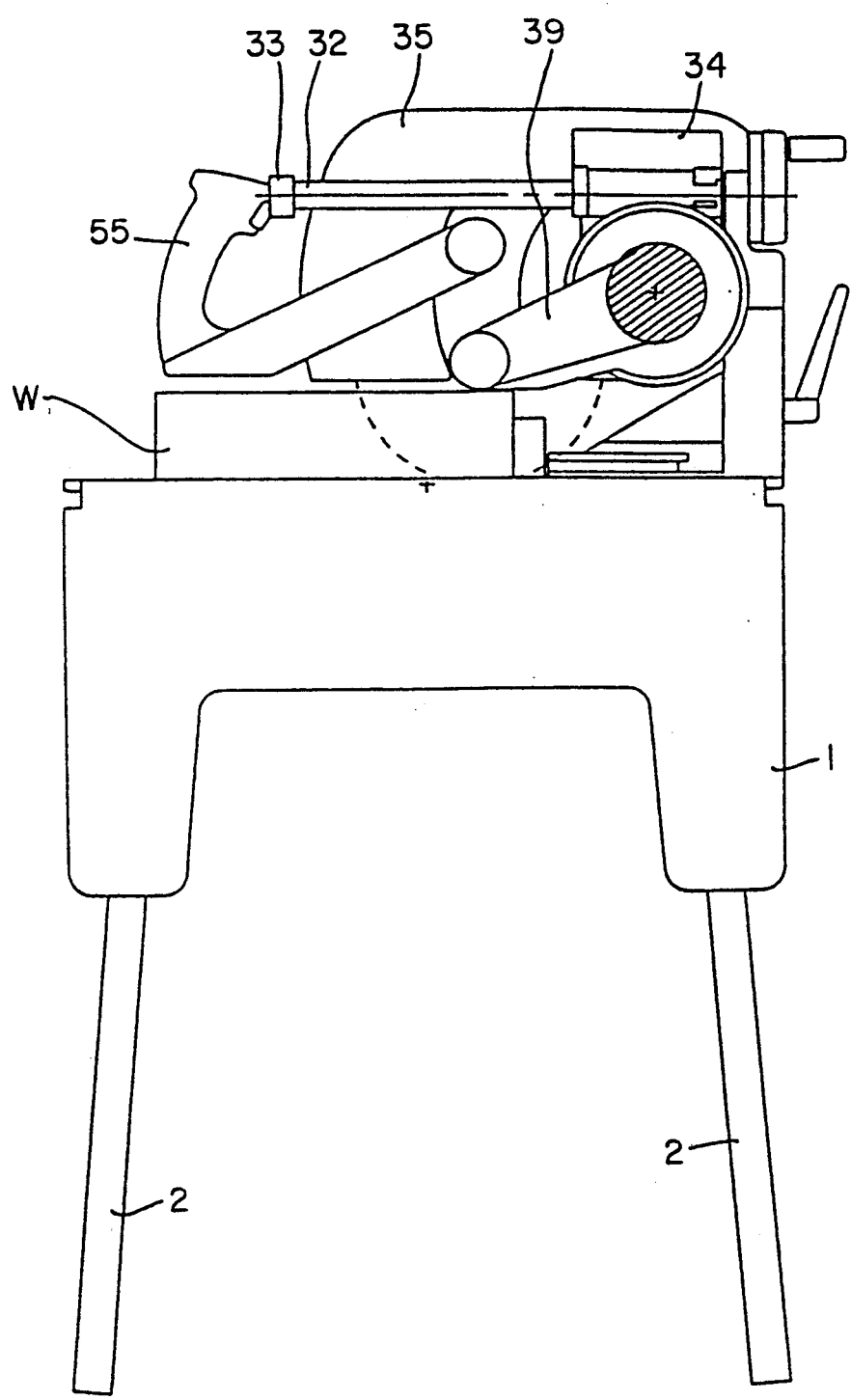
FIG. 4 shows a view as per FIG. 3 of the circular saw arrangement with the saw blade located in lowered cutting position.
Figure 14:
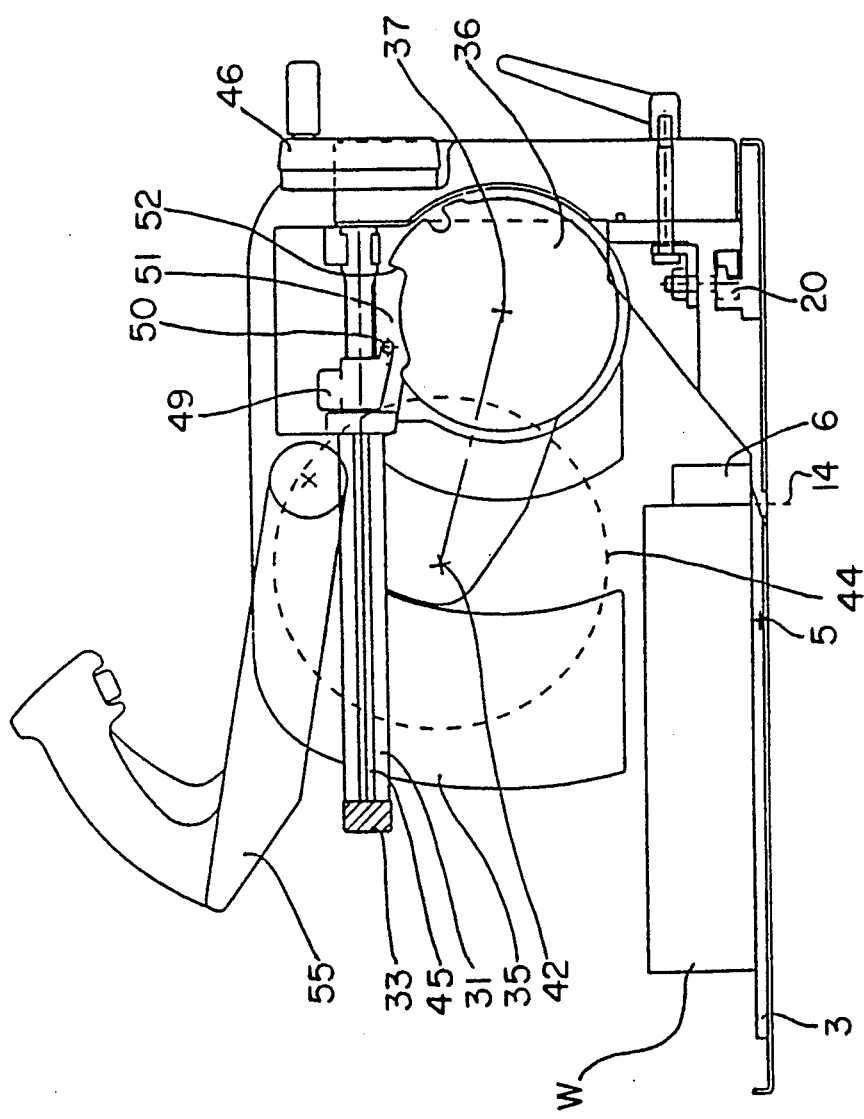
FIG. 14 shows, in a highly diagrammatic partial representation, the saw unit with saw blade located in elevated position in its starting position on the guide means.

By grasping the hand grip 55, the user can thus move the saw unit containing the electric motor 36 and the saw blade 44 out of the position as per FIG. 14 or FIG. 3 against the force of a spring, not shown, by moving the hand grip 55 downwards. This movement leads to a downward movement of the housing part 39, and thus to a rotational movement of the electric motor 36 in support ring 38 axis 37 of its armature shaft, and also to a downward movement of the saw blade 44 into the position as per FIG. 15 or FIG. 4. Thus there is no height-displacement of the electric motor 36 relative to the guide rods 31 and 32 because the latter is simply rotated within the support ring 38 about its axis 37.

Figure 5:
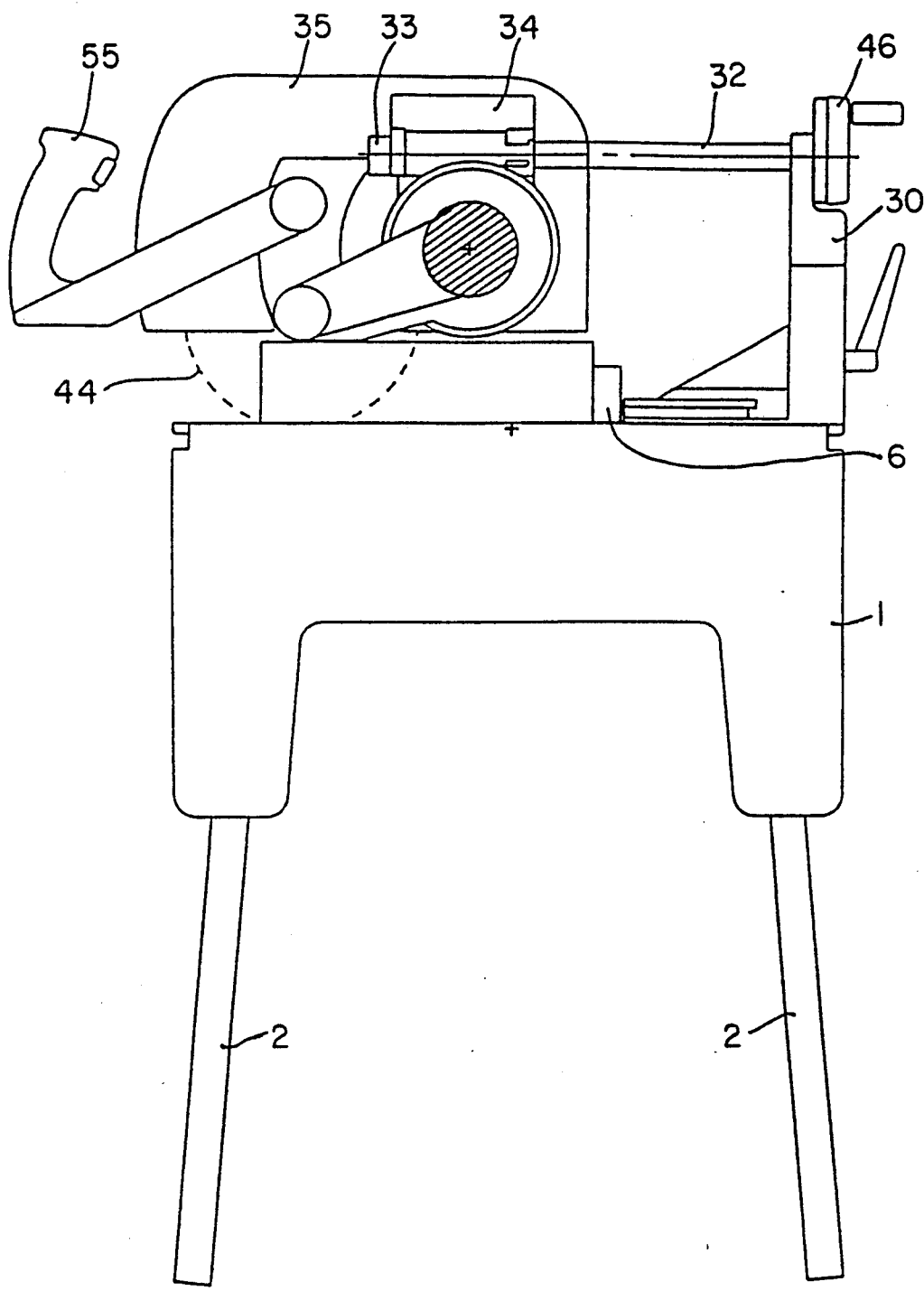
FIG. 5 shows the circular saw arrangement in a representation corresponding to FIGS. 3 and 4 with the saw blade lowered and moved in the longitudinal direction of the guide means.
Figure 15:
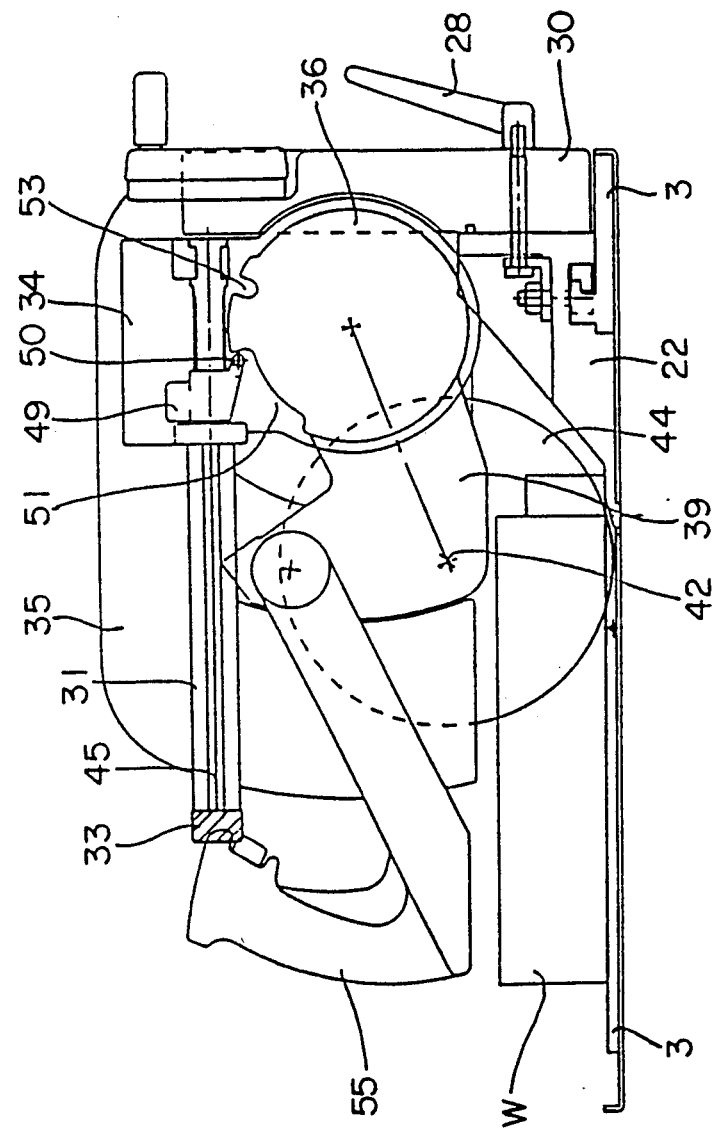
FIG. 15 shows the saw blade in a representation corresponding to FIG. 14 moved to its lowered cutting position and the saw unit located in the starting position.
Figure 16:
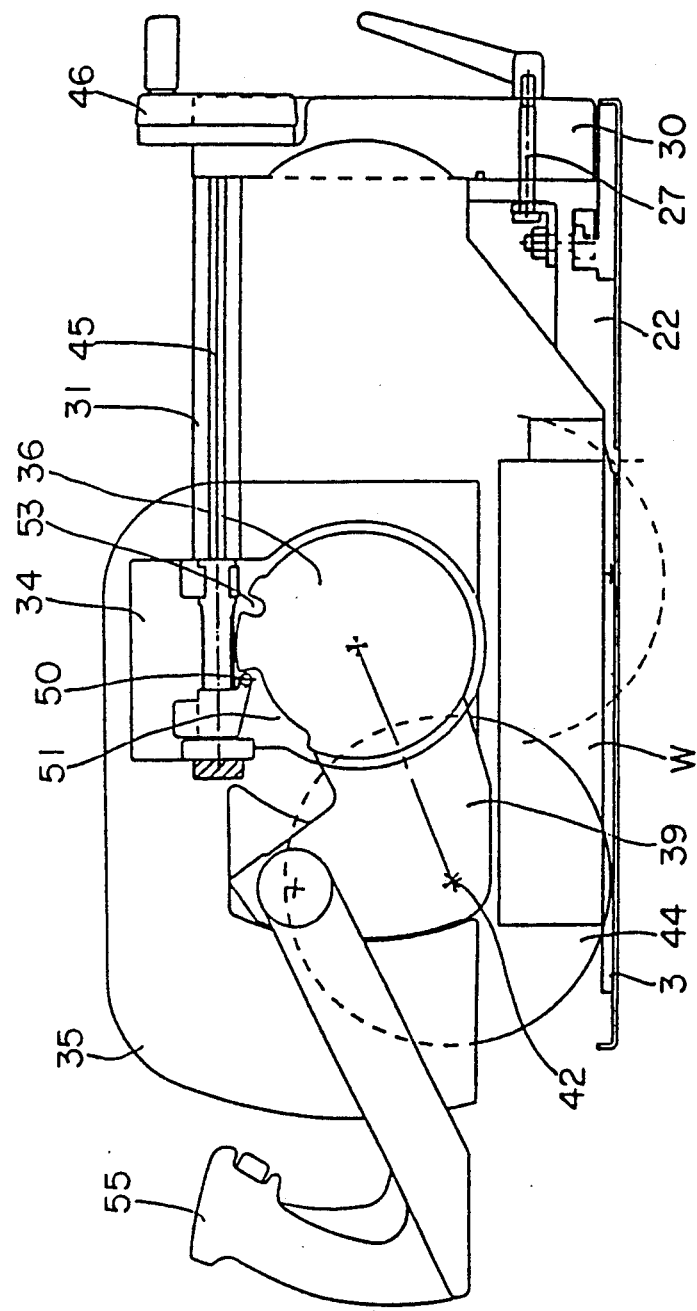
FIG. 16 shows the saw blade in a representation corresponding to FIG. 15 moved into the lowered cutting position and the saw unit moved to its maximum towards the free end of the guide means.
Figure 17:
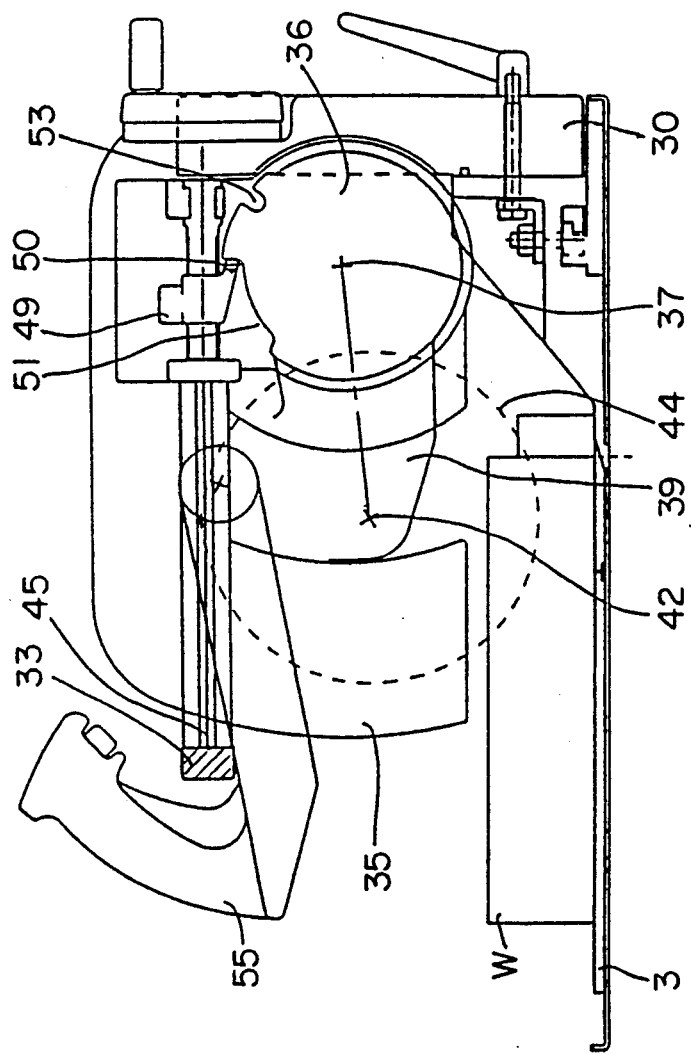
FIG. 17 shows the saw blade in a representation corresponding to FIG. 15 in a lowered position which lies above the cutting position as per FIGS. 15 and 16.

In addition, by pulling on the hand grip 55, the user can move the slide 34 against the force of a spring, not shown, out of the position as per FIG. 14 or as per FIG. 15 in the direction of the free end of the guide rods 31 and 32 until it meets the stop on the transverse element 33 (FIGS. 5 and 16).

If the support element 15 is located in the centre position as per FIG. 6, the user can carry out pure chop-cuts by performing the previously mentioned lowering of the saw blade 44 by means of pivoting about the axis 37 of the electric motor 36 and thus moving the saw blade 44 through the through-passage slot 17 in the support element 15 and the slot-like opening 10 in the area of the recess 11 of the table plate 3, in order to separate a workpiece, as the saw blade position in FIG. 16 shown by dashes indicates.

Usually, however, the circular saw arrangement represented is not only used to carry out pure chop-cuts, but also to make long cuts. This is achieved with the invention by combining chop-cut saw function with rip-saw function. For this, a limiting stop arrangement is present which essentially determines the position of the saw blade 44 during use.

Figure 22:
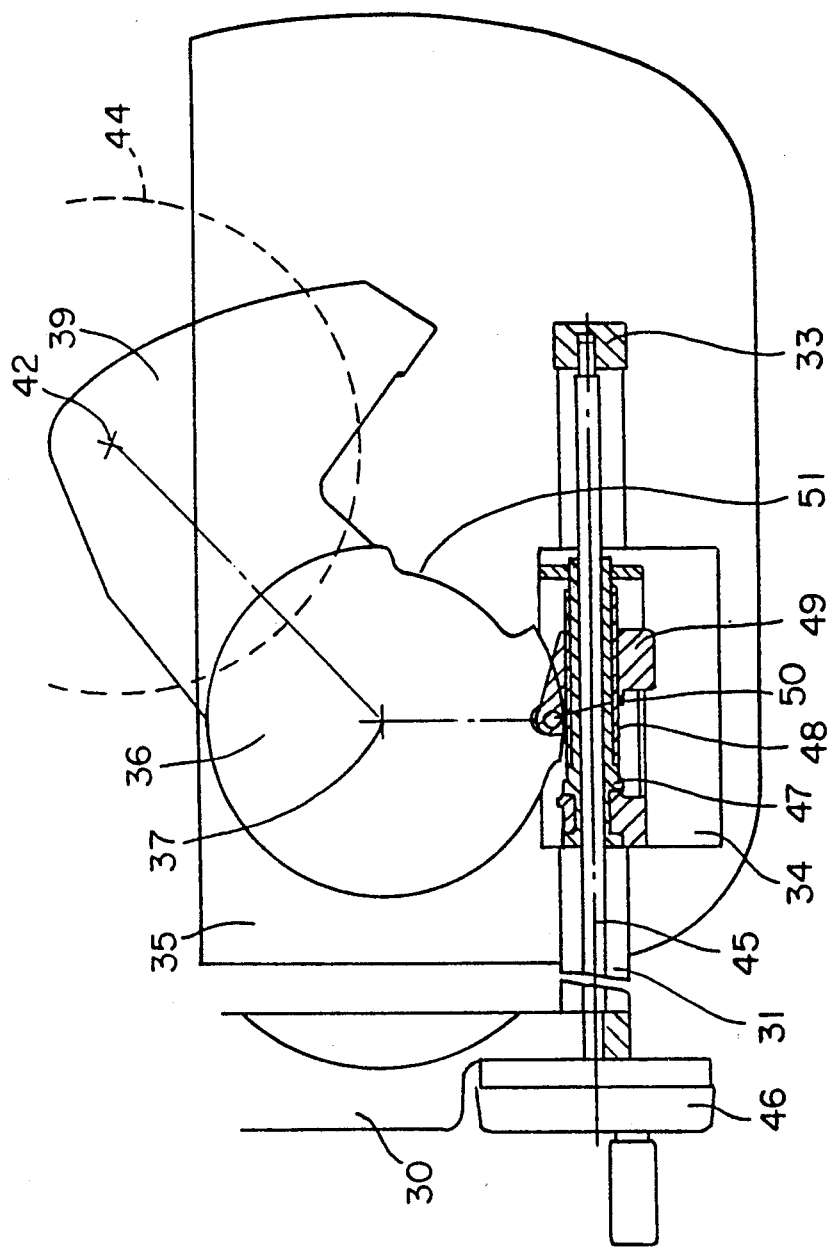
FIG. 22 shows, in a partial representation and partly in section along the line XII—XII from FIG. 11, the structure of the stop arrangement.

As shown, for example, in FIGS. 11 and 22, the limiting stop arrangement contains a stop 50, which is part of a stop element 49 that engages by screwing with the outer thread 48 of an adjusting bush 47 (FIG. 22). The adjusting bush 47 is mounted axially non-movable, but rotatable in the slide 34 and sits non-rotatable and axially slidable on the spindle 45 which has a hexagonal cross-section and extends between the guide rods 31 and 32. Thus, if the spindle 45 is rotated about its longitudinal axis by the user by actuation of the hand wheel 46, the screw engagement of adjusting bush 47 rotating of itself together with the spindle 44 and of stop element 49 causes an axial displacement of the stop element 49 along the adjusting bush 47. In this way the stop element 49 can be moved for example into the position as per FIGS. 14 and 16, and in this position, as FIGS. 14 and 16 show, it can be moved together with the slide 34 along the guide rods 31, 32.

Further, in the housing wall of the electric motor 36 the limiting stop arrangement has a recess 51 (FIG. 11), which, at its right-hand end in FIGS. 14 to 16, forms a stop face 52. Further, offset clockwise in the distance from the stop face 52 in FIGS. 14 to 16, a stop recess 53 is formed whose function will be described later.

As a comparison of FIG. 14 with FIGS. 15 and 16 shows, when the saw blade 44 is in the raised position the stop 50 is in the area above the recess 51 in the motor housing and at a distance from the stop face 52. If the saw blade 44 is lowered by pressing down the hand grip 55, the electric motor 36 is rotated about its axis 37 and the stop face 52 in the housing wall of the electric motor 36 approaches the stop 50 until it comes to rest against it. In this position, in which the saw blade 44 is in the so-called cutting position (FIGS. 15 and 16), no further lowering of the saw blade 44 is possible.

As shown in the illustrated embodiment, the cutting position is determined by the furthest left position of the stop element 49, i.e. by an end position of the stop element 49. In this cutting position, the saw blade 44 extends into the through-passage slot 17 in the support element 15, but does not project over or beyond the underside of the support element 15, i.e. the saw blade 44 is always above the plane formed by the upper surface of the recess 11 of the table plate 3. Therefore, the saw blade 44 does not cut into this table plate even if the support element 15 is rotated out of the center position as per FIG. 16 into a mitre position, say as per FIG. 8. Also in such a position, the workpiece W is initially cut into or through by means of a chop-cut by lowering the saw blade 44 from the position as per FIG. 14 into the position as per FIG. 15, in which the stop face 52 in the housing of the electric motor 36 abuts against the stop 50, so that no further lowering is possible, but the cutting position of the saw blade 44 is reached in which the lowest point of the saw blade 44 lies above the table plate 3. The user can move the saw blade 44 into the position as per FIG. 16, while maintaining this lowered position, by pulling on the hand grip 55 and through the resultant displacement movement of the slide 34 along the guide rods 31 and 32 in the form of a rip cut, in order thus to completely separate the workpiece W, the lower part of the saw blade 44 always extending into the through-passage slot 17 in the support element 15.

It should be pointed out that, to achieve a pure chop-cut saw function as indicated by the dotted-line position of the saw blade in FIG. 16, the user can pivot the stop 50, in the manner shown in FIG. 11-A out of the area of engagement with the stop face 52, so that lowering of the saw blade 44 beyond the aforementioned cutting position is possible. However, as already mentioned, this requires, in the table plate 3 below the through-passage slot 17 in the support element 15, a through-passage opening, say the slot-shaped opening 10, through which the saw blade 44 can pass downwards if lowered beyond the cutting position.

With the represented circular saw arrangement it is also possible, instead of completely separating a workpiece W according to the function as per FIGS. 15 and 16, to make a cut or slot of defined depth in the workpiece. To this end, the user can move the stop element 49 containing the stop 50 more to the right, compared with the position as per FIGS. 14 to 16, by rotating the spindle 45, say into a position as per FIG. 17. In this way, the stop face 52 comes to rest earlier against the stop 50 upon the lowering of the saw blade 44 and the associated rotation of the electric motor 36 about the axis 37, i.e. the saw blade 44 cannot be lowered into the aforementioned cutting position, but merely into a position in which it is still above the support element 15 or above its elongate section 16, i.e. does not completely separate the workpiece W when it is lowered as far as possible and is moved in this lowered position, by displacement of the slide 34, along the guide rods 31, 32 and through the workpiece W. The depth of penetration of the saw blade 44 is naturally constant over the whole course of the rip-cut because of the parallel arrangement of the guide rods 31, 32 relative to the stop face for the workpiece W.

As already mentioned, the saw blade 44 can be brought, by rotation of the support element 15 and of the holding part 30 connected to it about rotation axis 14, into a mitre-cut position in which it is no longer aligned perpendicular to the workpiece positioning face of the fence 6. Operation with a large cut width is also possible in such a mitre-cut position since, although the saw blade 44 extends, in the lowered cutting position as per FIGS. 15 and 16, into the through-passage slot 17 of the support element 15, it is always above the table plate 3.

In addition to the setting of mitre cuts, the saw blade 44 can be brought, by rotation of the support element 30 in the manner described above about the axis 56, into an inclined position relative to the main plane of the table plate 3 in order to make corresponding cut paths. In order that, in such an inclined position, the edge areas of the recess 7 in the fence 6 do not come into contact with the saw blade, the limiting edge 8 slopes, as shown in FIG. 11. Accordingly, the adjacent wall of the through-passage slot 17 is also inclined. The axis 56 about which the saw blade 44 is rotated into an inclined position lies at half height between the upper surface of the elongate section 16 of the support element 15 and the second side, i.e. the lower side in FIG. 11, of the table plate 3. The reason for this will be explained later.

Figure 18:
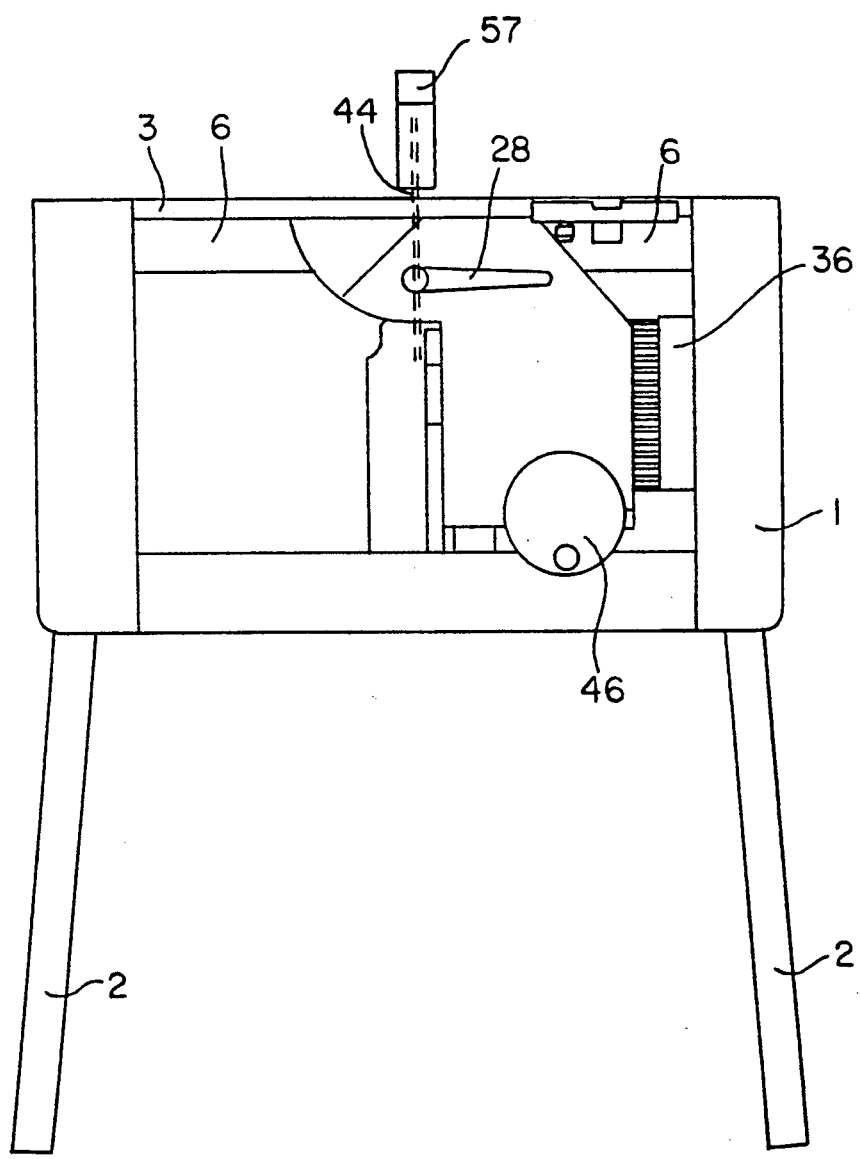
FIG. 18 shows the circular saw arrangement in a front view with the table plate located in the second
Figure 19:
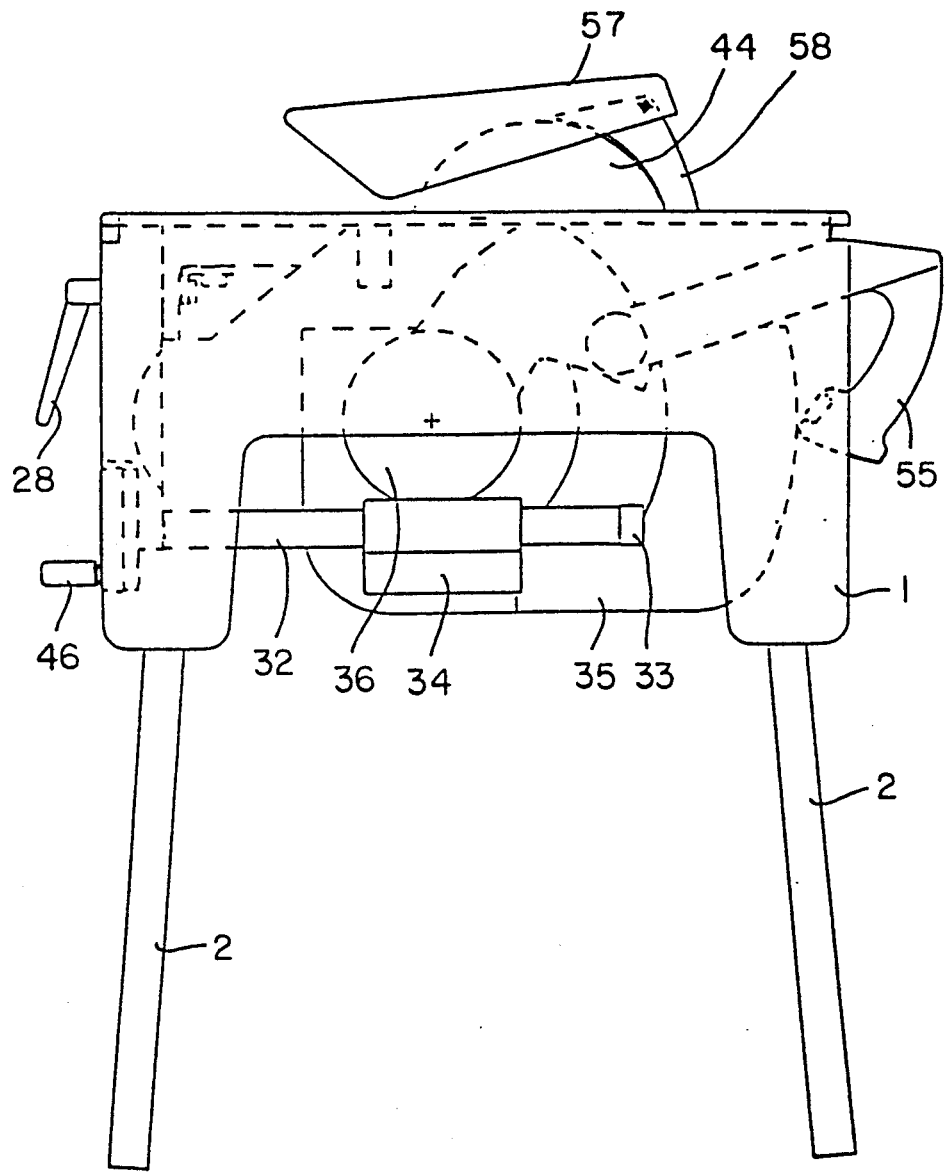
FIG. 19 shows a side view of the circular saw arrangement from FIG. 18.

As already mentioned, the table plate 3 is pivotable about the axis 5. If, therefore, the socket pins 4 are withdrawn in the position as per FIGS. 1 to 5, the table plate 3 can be rotated by 180 degrees, so that the second side of the table plate 3 is directed upwards, while the first side, and thus the support element 15 secured thereto, the guide means connected to the latter and the saw unit with electric motor 36 and saw blade 44 attached to the guide means are on the underside and thus within the frame 1, as shown in FIGS. 18 and 19. In this position, the socket pins 4 are re-inserted (FIG. 20) in order to fix the table plate relative to the frame 1. In this situation, the support element 15 must be in the center position as per FIG. 6, so that the through-passage slot 17 is flush with the slot-shaped opening 10 present in the table plate 3. If, therefore, the stop element 49 is pivoted, in the manner indicated in FIG. 11-A, from the area of the stop face 52, the user can raise the saw blade 44, by raising the hand grip 55, through the through-passage slot 17 and the slot-shaped opening 10, so that a section of the saw blade 44 projects over the second side, now lying on top, of the table plate 3. This raising movement is accompanied by a corresponding pivoting of the electric motor 36 about its axis 37 until the stop recess 53 formed in the housing wall of the motor 36 is in the area of the stop 50. If the stop element 49 is then pivoted back and the stop 50 thus made to engage with the stop recess 53, the stop 50 supports the electric motor 36 and thus the saw blade 44 in a position projecting over the second side of the table plate 3.

Figure 21:
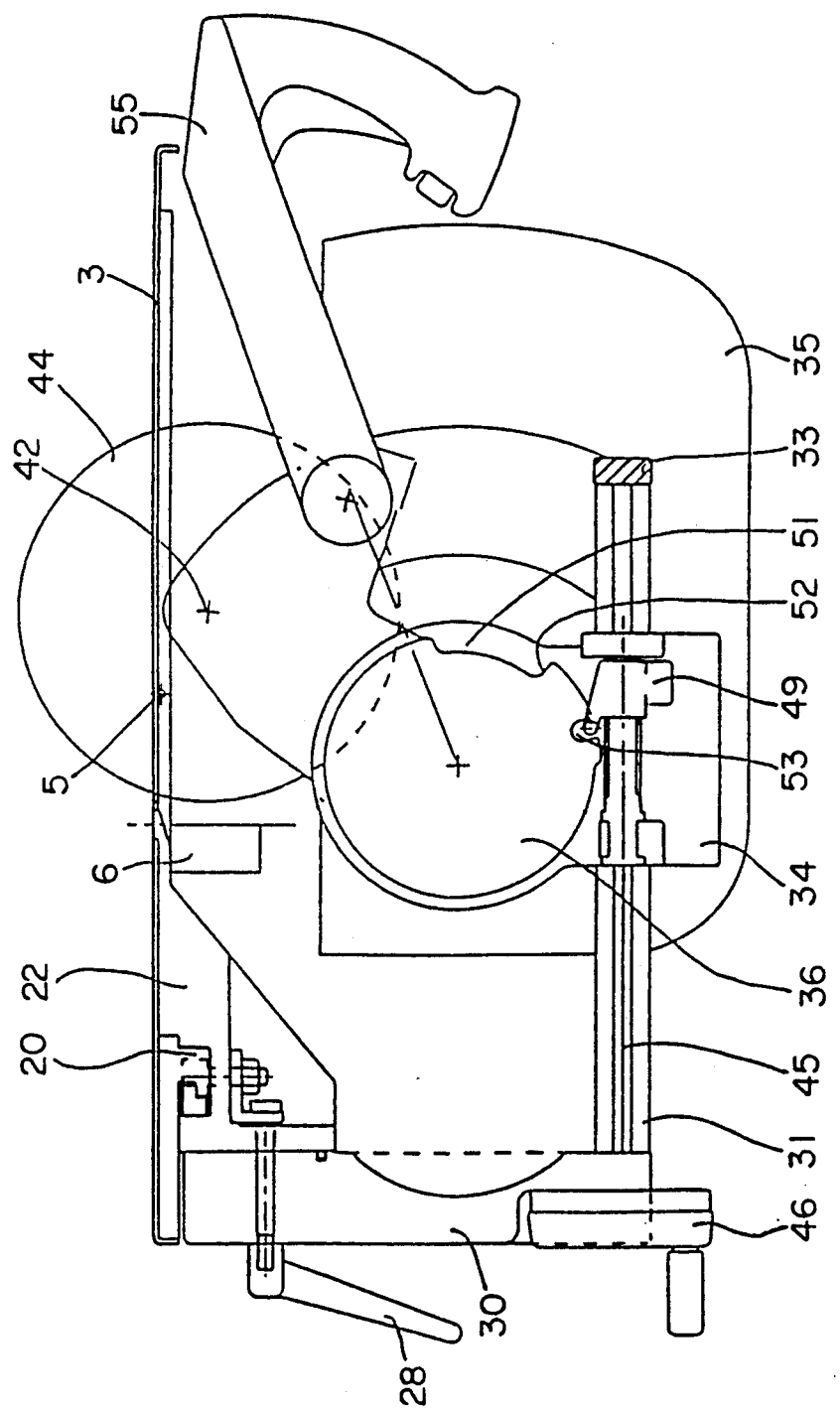
FIG. 21 shows the saw unit in a diagrammatic representation in the second position of the table plate with saw blade located in the sawing position.

It is of course possible, by moving the stop element 49 along the adjusting bush 47, to fix a position of the saw blade 44 which is lower than the one according to FIG. 21, as is shown in FIG. 22.

Figure 20:
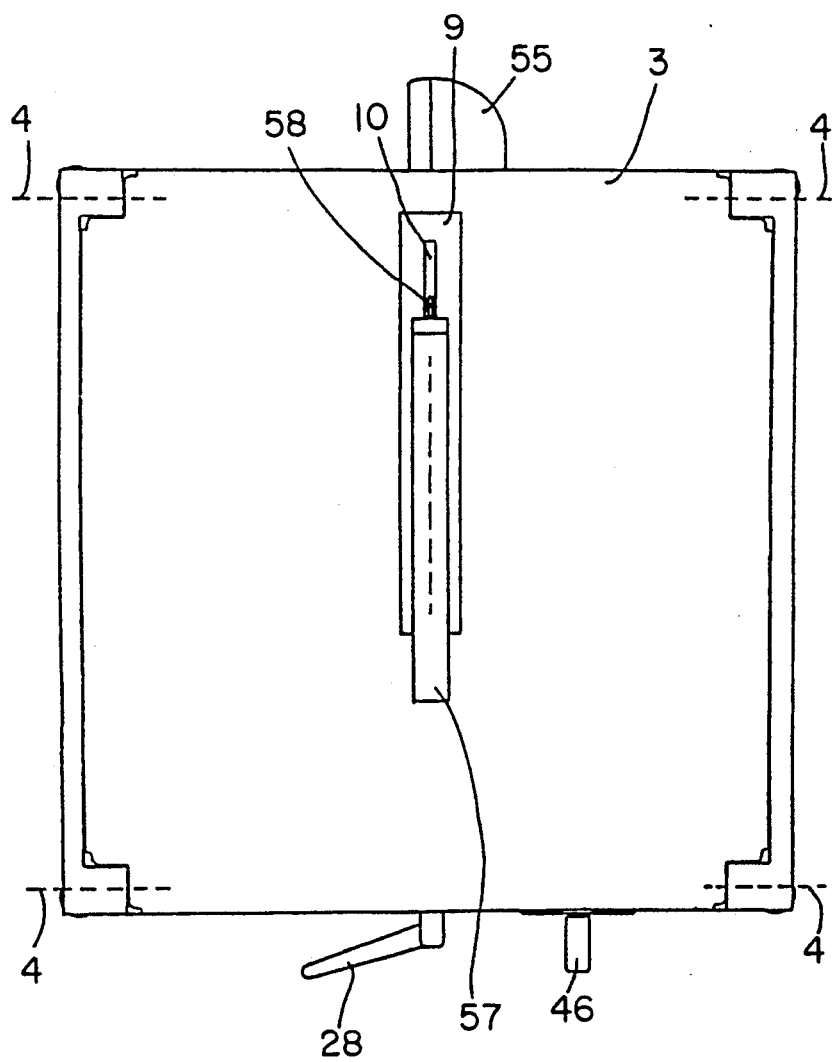
FIG. 20 shows a plan view of the circular saw arrangement according to FIGS. 18 and 19.

It should be mentioned that the safety regulations for the operation of a circular-saw bench formed as per FIGS. 18 to 20 require the presence of a riving knife 58 and a protective cover 57. Such a riving knife can be inserted for fitting from above through a section of slot-shaped opening 10 and through-passage slot 17 not filled by the saw blade 44 and secured to the protective cover 35 in a manner that is not shown. The protective cover 57 can be attached at the upper end of the riving knife 58. Fences can also be attached to the second side of the table plate 3 to guide the workpiece to be machined.

While it is naturally not possible, in the position as circular-saw bench as per FIGS. 18 to 20, to bring the saw blade 44 into a mitre position, the saw blade 44 can however be brought into an inclined position n the manner described by rotation about the axis 56, the procedure being the same as explained in connection with FIGS. 1 to 17. As indicated in FIG. 11, the side walls of the slot-shaped opening 10 can be correspondingly inclined for this purpose.

The fact that, as mentioned above, the axis 56 is arranged centrally relative to the total thickness of table plate 3 and support element 15, is advantageous in that the displacement movements of the saw blade 44 relative to through-passage slot 17 and slot-shaped opening 10 are, in the case of movement into an inclined position, the same in the position as per FIGS. 1 to 17 and in the position as per FIGS. 18 to 20, i.e. the widths of through-passage slot 17 and of slot-shaped opening 10 can be minimal.

Another consequence of the small material thickness of the area of the support element 15 containing the through-passage slot 17 and of the table plate 3 in the area of the recess 11 is that the saw blade 44 can, in the position as per FIGS. 18 to 20, project relatively far over the second side, serving as work surface, of the table plate 3.

The structure and function of the circular saw arrangement as per FIGS. 23 to 32 partly match those in FIGS. 1 to 22, and the numbers of identical or similar parts are thus those used in FIGS. 1 to 22, but increased by 100. Reference can also be made for explanations concerning these parts, to the statements made in connection with FIGS. 1 to 22.

The circular saw arrangement as per FIGS. 23 to 32 has a base or table plate 103 in which is formed a recess 111 into which is inserted, rotatable about an axis 114, a support element 115 having an essentially circular area arranged concentrically about the rotation axis 114 and an elongate section 116 on said area. A saw slot 117, open at the top, extends in the support element 115 from the rotation axis 114 to shortly before the outer end of the elongate section 116. Arranged on the base or table plate 103 is a fence 106 which corresponds to the fence 6 of the circular saw arrangement as per FIGS. 1 to 22 in terms of its shape and position relative to the rotation axis 114. The recess 111 widens on the side of the fence 106 facing the work-piece positioning face and forms outwardly diverging side walls 112 and 113 which serve as stops to limit the rotation movement of the support element 115 and thus define the maximum possible mitre positions of the saw blade 144. The base wall 170 of the recess 111 has, in the outer edge area connecting the side walls 112 and 113, cuts 171 which serve, in a manner to be described, to position the saw blade 144 in the mitre position.

Secured to the side of the support element 115 opposite the elongate section 116 is a connection part 122 to which is connected an upwardly extending holding part 130 which serves to hold the guide means for the saw unit.

The structure described thus far corresponds essentially to that of the circular saw arrangement according to European Patent No. 0 242 733.

Secured to the upper end of the holding part 130 is a guide means comprising two parallel guide rods 131, 132, its guide rods 131, 132 running parallel to each other and parallel to the plane of the upper surface, serving as workpiece-reception and support surface, of the table plate or base 103 and the upper surface of the support element 115. The guide rods 131 and 132 also extend parallel to the saw slot 117 in the annular part of the support element 115 and in its elongate section 116 and at the same vertical distance from the latter. They extend from holding part 130 over the fence 106 and in this direction beyond the annular part of the support element 115 and are connected at their free ends, located there, by a transverse element 133.

Arranged between the guide rods 131 and 132 and parallel to them is a spindle 145, corresponding in terms of function type and controllability to the spindle 45 as per FIGS. 1 to 22, a knurling wheel 146, shown diagrammatically in FIG. 27, serving for rotation instead of a hand wheel corresponding to the hand wheel 46 from FIGS. 1 to 22.

Seated on the guide rods 131, 132 and slidable in their longitudinal direction is a slide 134 to which is pivotably secured the saw unit which contains an electric motor, said motor being secured, rotatable about its center axis 137, to the slide 134 and its housing displaying an arm-shaped section 139, in the outer end of which is provided the bearing of the saw blade 144 rotatable about the axis 142 and in which runs the drive belt, not shown in this embodiment, for the coupling of electric motor 136 and saw blade 144. Reference is made in respect of this design to the explanations relating to the embodiment according to FIGS. 1 to 22.

A hand grip 155 is connected to the saw unit in accordance with the embodiment as per FIGS. 1 to 22, and a protective cover 135, enclosing the upper part of the saw blade 144, is attached to the slide 134.

The circular saw arrangement according to FIGS. 23 to 32 also has a limiting-stop device corresponding to that of the circular saw arrangement from FIGS. 1 to 22. Thus, there is in the housing wall of the electric motor 136 a recess 151 which extends in peripheral direction and forms at its rear end, viewed clockwise (FIG. 27), a stop face 152. Located in the slide 134 is a stop element 149 which is axially adjustable through rotation of the spindle 145 by means of the knurling wheel 146 seated on it and axially movable with the slide, so that the stop 150 provided at the stop element 149 can be brought into various positions relative to the recess 151. If the stop element 149 is in its left-hand end position, in FIG. 27, in the slide, the electric motor 136 can be rotated to its greatest extent about its axis 137 and the saw blade 144 thus be lowered to its greatest extent, before the abutment of the stop 150 against the stop face 152 of the recess 151 limits further downward movement. In this lowest cutting position, the deepest point of the saw blade 144 is within the saw slot 117 in the support element 115 (FIGS. 25 and 26), but naturally above the base or bottom wall of the saw slot 117. On the other hand, if the stop element 149 is brought into a position further to the right on the slide 134 (FIG. 27), the engagement of stop 150 and stop face 152 limits the lowering of the saw blade 144 at an earlier stage, i.e. the saw blade 144 can be made to engage with the workpiece W to produce a cut or a groove of constant depth, but the workpiece W cannot be completely cut through because the saw blade 144 cannot drop into the saw slot 117.

A combined chop- and rip-cut can thus be performed with the circular saw arrangement according to FIGS. 23 to 32, the saw blade 144 being lowered, with the slide 134 in a position at the end of the guide rods adjacent to the holding part 130, by rotation of the saw unit about the center axis 137 of the electric motor 136, until the stop 150 limits further downward movement of the saw blade 144 by virtue of abutment against the stop face 152. There may be a separation of a part of the workpiece W if the saw blade 144 can be lowered into the cutting position as per FIGS. 25 and 26, or a cut may be made in the workpiece W, as is the case when it is lowered as per FIG. 27. The user can then draw the lowered saw blade 144 through the workpiece W, maintaining the engagement of stop 150 and stop face 152, by pulling on the hand grip 155 and through the resultant displacement of the slide 134 along the guide rods 131, 132, during which process he must overcome the elastic force, produced by a spring arrangement, normally acting on the slide 134 and also hold the saw blade 144 in a lowered position against a spring force which is usually in effect. However, the spring force to be overcome to lower the saw blade 144 into the deepest position, in which the stop 150 abuts against the stop face 152, remains constant throughout the rip-cut, as the distance of the saw blade 144 from the guide rods 131, 132 does not change during the rip-cut.

Figure 23:
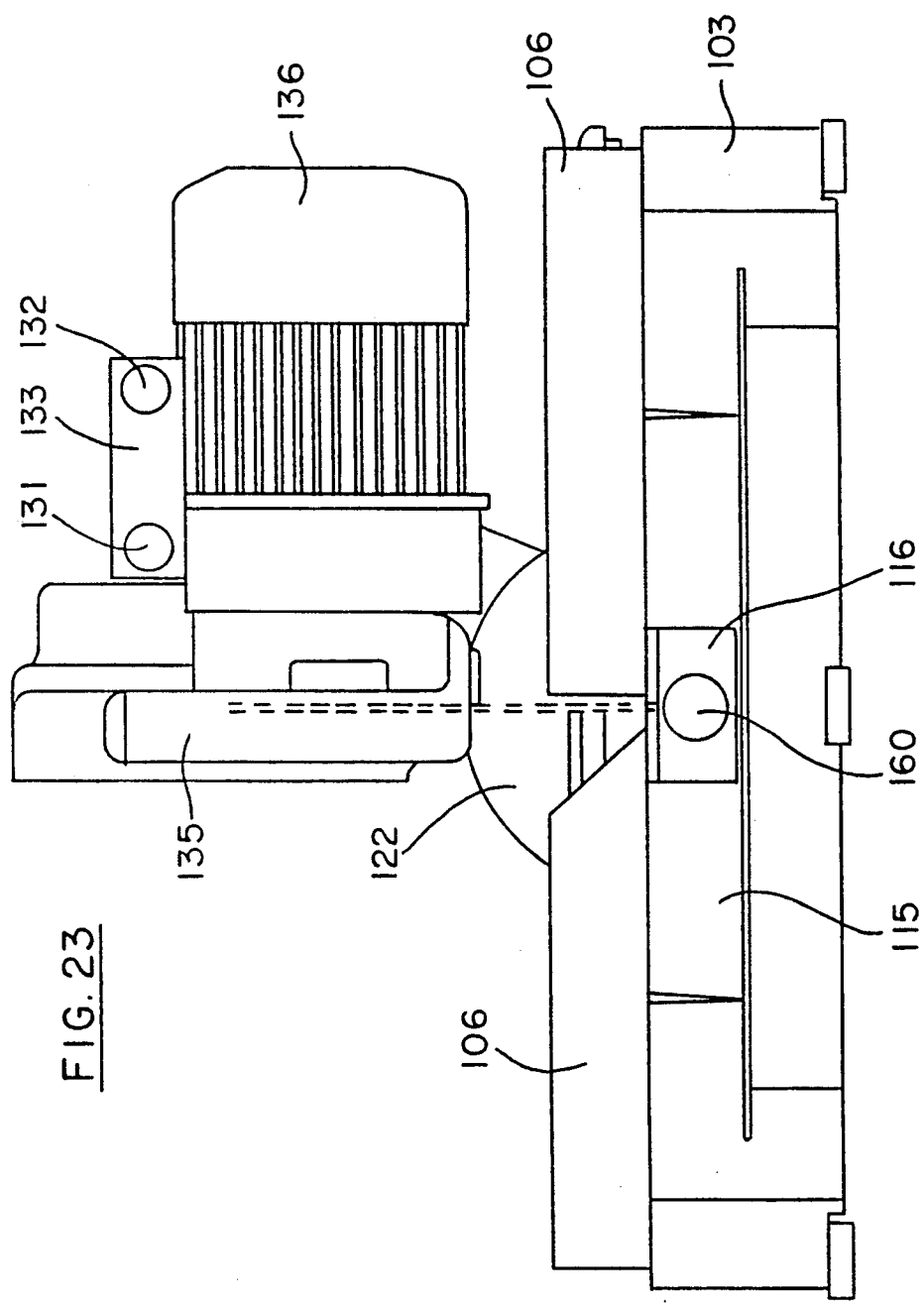
FIG. 23 shows a front view of a second embodiment of a circular saw arrangement.
Figure 24:
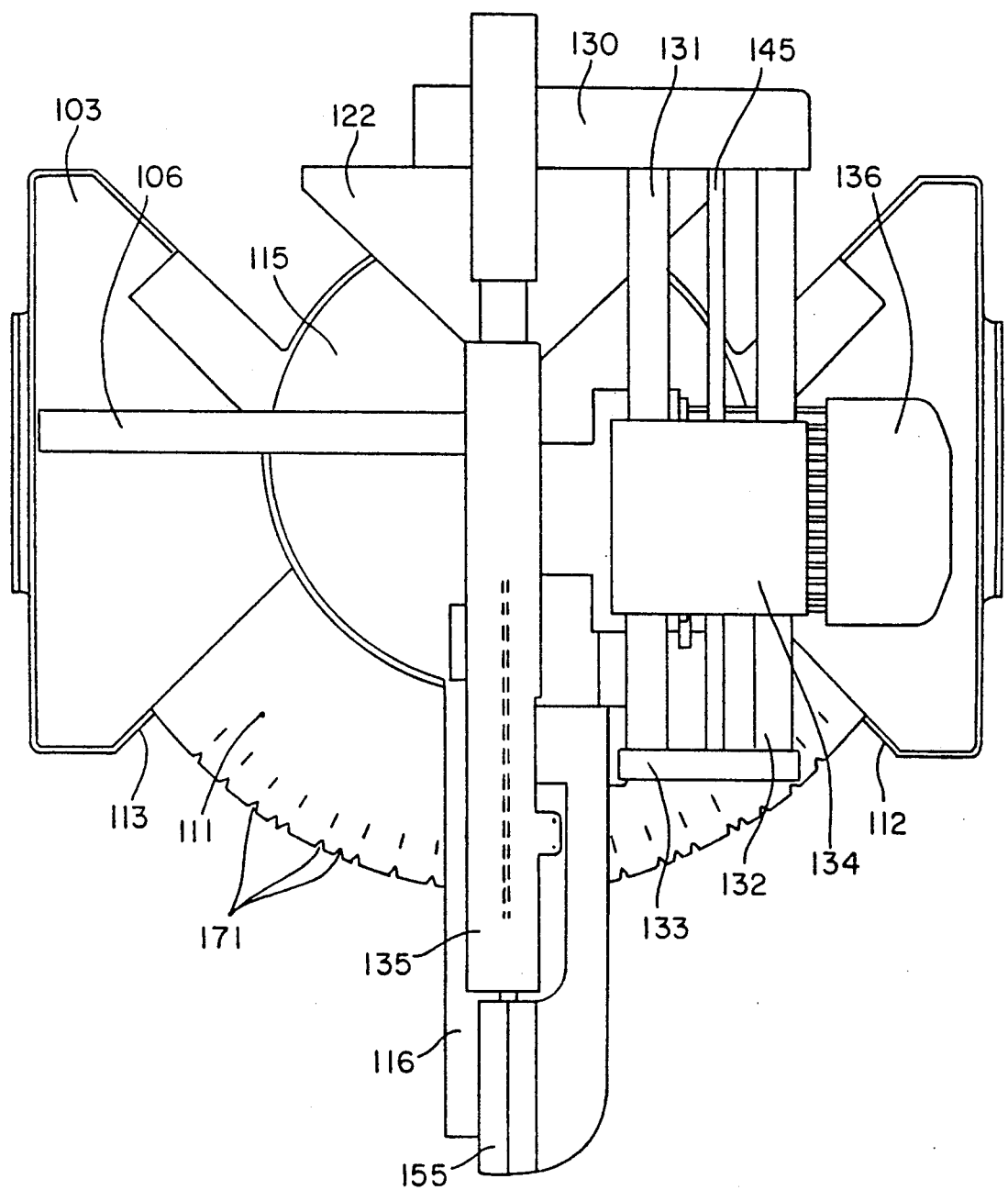
FIG. 24 shows a top plan view of the circular saw arrangement from FIG. 23.
Figure 30:
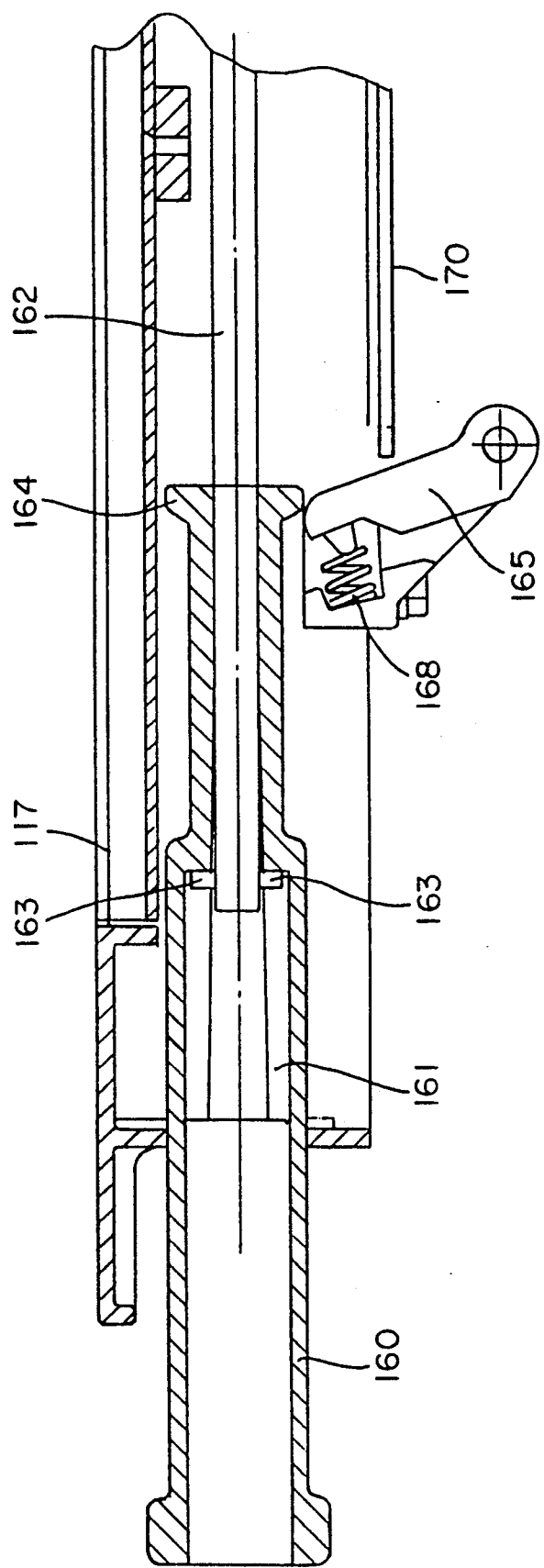
FIG. 30 shows the setting device, in a representation corresponding to FIG. 28, in the position to set the saw blade for a mitre cut.
Figure 31:
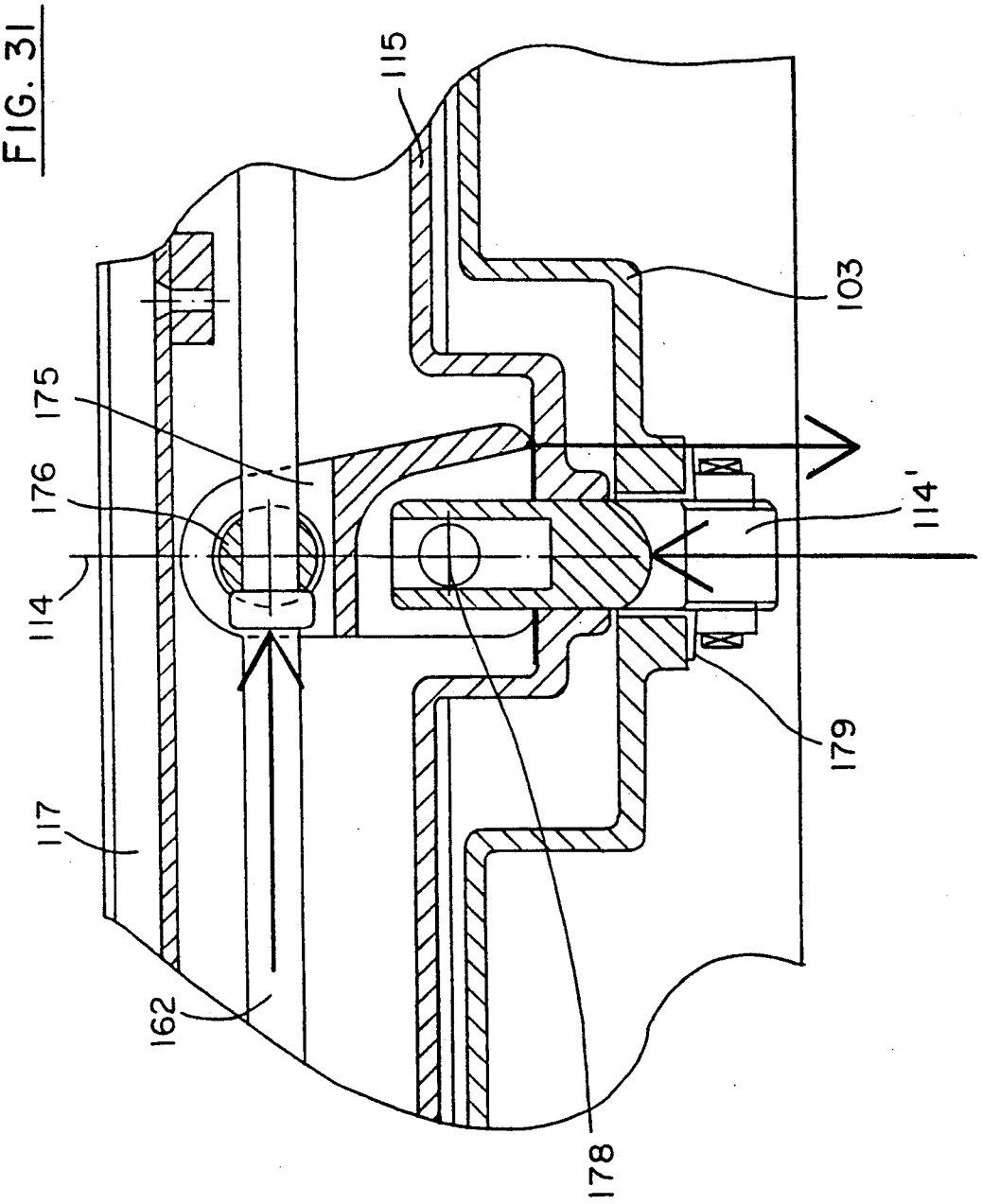
FIG. 31 shows, in a partial section, the area of the pivot axis of the support element and of the table plate including the associated parts of the setting device.
Figure 32:
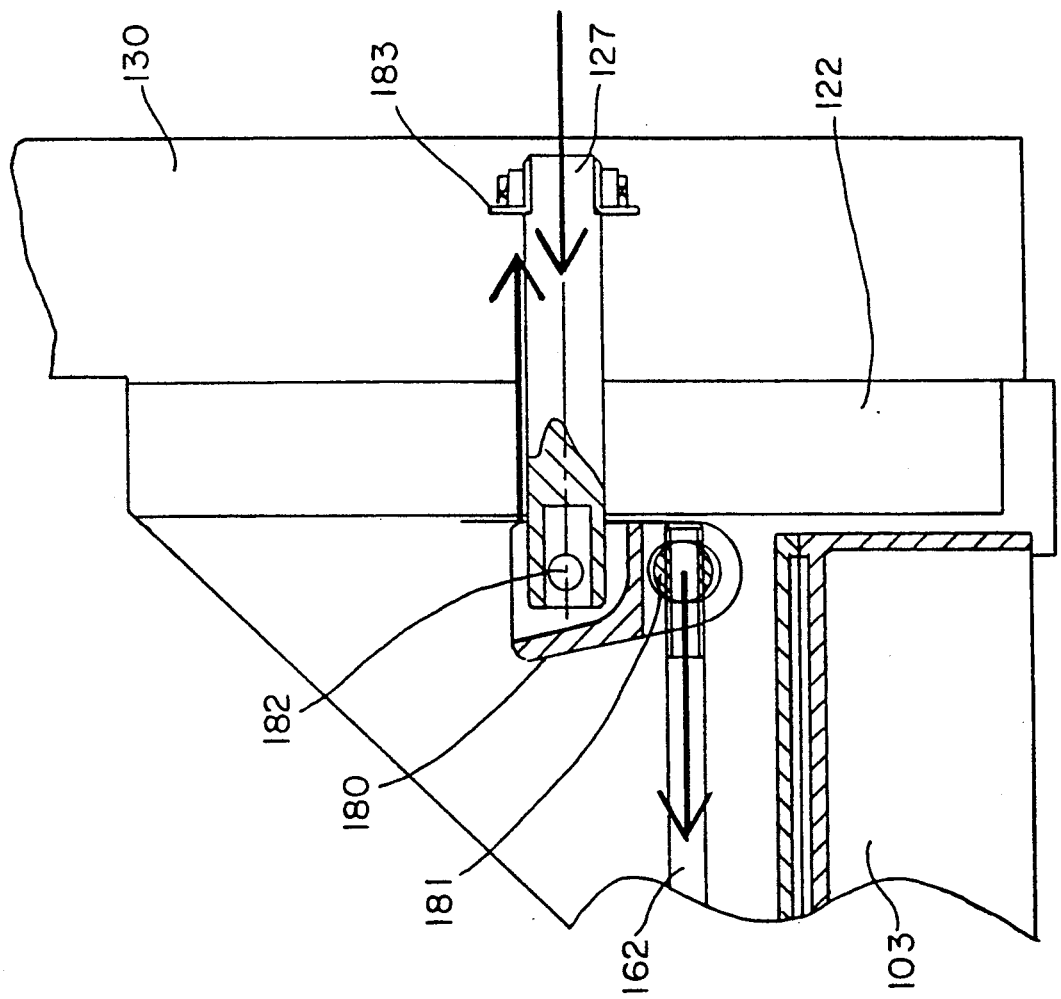
FIG. 32 shows, in a simplified partial section, the area of the setting device used to set the saw blade for an inclined cut.

As already mentioned, the saw blade 144 can be brought into various mitre positions by rotation of the support element 115 about the rotation axis 114, i.e. it can be moved out of the center position as per FIGS. 23 and 24 in the direction of the side wall 112 or the side wall 113 of the recess 111 and thus brought into a sloping or inclined position relative to the workpiece positioning face of fence 106. The setting device provided for this purpose is essentially shown in FIGS. 26 and 28-32.

The setting device has a setting spindle 162 which extends on the underside of the support element 115 and carries at its front end a setting bush 160 accessible to the user at the outer end of the elongate section 116 of the support element 115. The outer end of the setting spindle 162 sits in a reception section 161 of the setting bush 160 and is held unrotatable in same by projections 163.

Defined, pivotable about an axis 166, to the underside of the elongate section 116 in the area of the outer edge of the recess 111 is a latch 165 which is pressed by a spring 168 in the direction of the outer edge of the bottom 170 of the recess 111 and thus normally into engagement with one of the cuts or recesses 171 in this edge. The annular rib 164 formed at the inner end of the setting bush 160 can engage with the outer end of the latch 165, through axial displacement of the setting bush 160 relative to the setting spindle 162 from the position as per FIG. 28 into the position as per FIG. 30, and bring said latch, against the force of the spring 168, out of engagement with the edge of the bottom 170 of the recess 111, so that the latch 165 no longer prevents a rotation of the support element 115 about the rotation axis 114.

A clamp part 175, used for the defined positioning of the support element 115 relative to the base or table plate 103 in a desired mitre position of the saw blade 144, is present in the area of the rotation axis 114 and coupled via an eccentric bush 176 with the setting spindle 162, said setting spindle 162 being unrotatably connected to the eccentric bush 176. If the setting bush 162 is rotated by corresponding rotation of the setting spindle 160 for example in the direction of a clamping, the eccentric bush 176 rotates together with the setting spindle 162, and the clamp part 175 is pressed downwards, as indicated by an arrow in FIG. 31, and brought to abut against a face of the support element 115 that lies laterally relative to the rotation axis 114. As a result of the connection 178 with the clamp part 175, the consequence of this eccentric abutment is that the axis element 114' forming the rotation axis 114 is drawn upwards in the direction of the arrow and the plate spring 179 connected thereto is therefore pressed against the underside of the base or table plate 103. The support element 115 is thus clamped fast in the area of the rotation axis 114 and therefore defined unrotatably against the table plate 103, which is especially necessary if the saw blade 144 is brought into a mitre position in which the latch 165 does not engage with a cut or recess 171 in the bottom 170.

Accordingly, rotation of the setting spindle 162 allows the saw blade 144 to pivot into an inclined position, i.e. into a position which is inclined relative to the support face of table plate 103 and support element 115. To this end, the end of the setting spindle 162 facing away from the setting bush 160 is engaged, via an eccentric bush 181 corresponding to the eccentric bush 176, with a clamp part 180 which is coupled at 182 with a clamp bolt 127 which extends through both the connection part 122 and the holding part 130. In the clamp position, the clamp bolt 127 pulls the plate spring 183 and clamps it against the holding part 130, while the clamp part 180 is supported firmly, as indicated by the arrow, against the connection part 122, so that connection part 122 and holding part 130 cannot be pivoted against each other. By releasing the engagement of the clamp part 180 through corresponding rotation of the setting spindle 162, it becomes possible to pivot the holding part 130 and thus the saw blade 144 relative to the connection part 122 and thus relative to the support face for the workpiece W and thus bring it into the position for the desired inclined cut. In this position, the clamp connection is then re-established by rotation of the setting spindle 162. As the two embodiments according to FIGS. 1 to 22 and FIGS. 23 to 32 show, the result of forming the guide means 31, 32 or 131, 132 for the slide 34 or 134 is that practically no bulky parts project at the rear of the circular saw arrangement and that, in particular, the guide means are not extended over the rear of the circular saw arrangement or moved out over same when in operation. They are, rather, located in a longitudinally non-movable position above the table plate and in the area of same. The saw unit can be moved along the guide means 31, 32 or 131, 132 in such a way that the saw blade 44 or 144 which has been lowered into a pre-set position can be guided through a workpiece without changing its vertical position, so that rip-cuts for the separation of the workpiece or for the manufacture of cuts or slots of a pre-set depth can be carried out in the workpiece in the simplest manner, no change in the height of the electric motor occurring particularly upon the pivoting about its longitudinal axis 37 or 137 of the electric motor 36 or 136 driving the saw blade 44 or 144.

I claim:

1. A circular saw assembly for producing both chop-saw and rip-saw cutting movements comprising:
   (a) means forming a support base having a predetermined length,
   (b) vertically extending support means having a lower end and an upper end, the lower end being connected to the support base,
   (c) elongated, horizontally extending guide means extending along the length of the support base and having a length less than the length of the support base, the guide means having first and second ends, the first end being rigidly connected to and non-movably supported relative to the upper end of the vertically extending support means, the second end of the guide means being unsupported and extending cantilevered from the connection of the first end to the vertically extending support means,
   (d) slide means mounted on the guide means for horizontal sliding movement along the cantilever, horizontally extending, non-movable guide means,
   (e) motor means, the motor means including an armature having an axis of rotation,
   (f) circular saw blade means, the circular saw blade means having an axis of rotation,
   (g) structure means connecting the circular saw blade means to the motor means with the axis of rotation of the blade means being spaced from and parallel to the axis of rotation of the armature,
   (h) drive means connecting the motor means to the blade means to rotate the blade means,
   (i) motor mounting means, the motor mounting means connecting the motor means to the slide means for providing horizontal rip-saw movement of the blade means, and
   (j) the motor mounting means including pivoted support means for providing pivoted chop-saw movement of the blade means, the pivoted support means having a pivotal axis parallel to the axes of rotation of the blade means and the armature.

2. The circular saw assembly of claim 1 in which the pivotal axis of the pivoted support means extends through the motor means.

3. The circular saw assembly of claim 1 in which the pivotal axis of the pivoted support means extends coaxially with the axis of rotation of the armature.

4. The circular saw assembly of claim 3 in which the motor means includes a housing having a circular cross-section, and the pivoted support means comprises generally ring-shaped support means surrounding at least a portion of the circular motor housing, the ring-shaped support means securing the motor means for pivoted movement about the axis of the armature.

5. A circular saw assembly for producing chop-saw cutting and rip-saw cutting at variable mitre angles comprising
   (a) means extending horizontally forming a support base;
   (b) a support element pivotally mounted on the base for arcuate movement in a horizontal plane,
   (c) a vertically extending support member connected to the pivotally mounted support element,
   (d) elongated guide means having one end rigidly connected to and non-movably supported relative to the vertically extending support member, the elongated guide means extending horizontally in a fixed position above the support base,
   (e) slide means mounted on the guide means for horizontal sliding movement along the guide means,
   (f) motor means including an armature having an axis of rotation,
   (g) circular saw blade means having an axis of rotation, the circular saw blade means being supported by, and operatively connected to be driven by, the motor means, wherein the axis of rotation of the saw blade means is spaced from and parallel to the axis of rotation of the armature,
   (h) motor mounting means connecting the motor to the slide means for horizontal, rip-saw cutting movement of the blade means, and
   (i) the motor mounting means including pivoted support means for providing pivoted movement of the motor means and chop-saw movement of the blade means about the motor means, the pivoted support means having a pivotal axis parallel to the axis of the armature; whereby the blade means provides both chop-saw and rip-saw functions at variable mitre angles by variably positioning the pivotally mounted support element.

6. The circular saw assembly of claim 5 in which the pivotal axis of the pivoted support means extends through the motor means.

7. The circular saw assembly of claim 5 in which the pivotal axis of the pivotal support means extends co-axially with the axis of rotation of the armature.

8. The circular saw assembly of claim 7 in which the motor means includes a housing having a circular cross-section, and the pivoted support means comprises a generally ring-shaped support element surrounding at least a portion of the circular motor housing.

* * * * *